(12) United States Patent
Arima

(10) Patent No.: US 7,260,262 B2
(45) Date of Patent: Aug. 21, 2007

(54) DISPLAY CONTROL METHOD, AND PROGRAM, INFORMATION PROCESSING APPARATUS AND OPTICAL CHARACTER RECOGNIZER

(75) Inventor: Toshimichi Arima, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 602 days.

(21) Appl. No.: 10/434,503

(22) Filed: May 8, 2003

(65) Prior Publication Data

US 2004/0001629 A1 Jan. 1, 2004

(30) Foreign Application Priority Data

Jun. 28, 2002 (JP) ............................. 2002-191543

(51) Int. Cl.
*G06K 9/00* (2006.01)
*G06K 9/03* (2006.01)
*G09G 1/14* (2006.01)

(52) U.S. Cl. .......................... 382/189; 382/310; 345/25

(58) Field of Classification Search ................ 382/189, 382/310; 345/25
See application file for complete search history.

(56) References Cited

U.S. PATENT DOCUMENTS

| | | | | |
|---|---|---|---|---|
| 4,860,372 A | * | 8/1989 | Kuzunuki et al. | 382/189 |
| 5,151,948 A | * | 9/1992 | Lyke et al. | 382/138 |
| 5,389,745 A | * | 2/1995 | Sakamoto | 178/18.03 |
| 5,870,492 A | * | 2/1999 | Shimizu et al. | 382/187 |
| 5,890,178 A | * | 3/1999 | Haneda | 715/516 |
| 6,004,973 A | * | 12/1999 | Guitard et al. | 514/291 |
| 6,005,973 A | * | 12/1999 | Seybold et al. | 382/187 |
| 6,064,765 A | * | 5/2000 | Hirayama | 382/189 |
| 6,424,743 B1 | * | 7/2002 | Ebrahimi | 382/189 |
| 6,661,409 B2 | * | 12/2003 | Demartines et al. | 345/173 |
| 6,748,123 B1 | * | 6/2004 | Zlotnick et al. | 382/311 |

FOREIGN PATENT DOCUMENTS

| | | |
|---|---|---|
| JP | 06096266 | 4/1994 |
| JP | 06096263 | 8/1994 |
| JP | 10021326 | 1/1998 |
| JP | 10049623 | 2/1998 |
| JP | 11213087 | 6/1999 |

\* cited by examiner

*Primary Examiner*—Joseph Mancuso
*Assistant Examiner*—Kathleen Yuan
(74) *Attorney, Agent, or Firm*—Duke W. Yee; Justin M. Dillon; Wayne P. Bailey

(57) ABSTRACT

A method for controlling the display of a screen which allows the user to discriminate the scanned image and the recognition result intuitively and easily. The display control method for allowing the user to verify the recognition result of a character on a verification screen form is implemented as follows. First of all, the standard pattern of a specific character stored in a memory and a plurality of character images recognized as the specific character are read, upon an operation of the user. And the read standard pattern is displayed in a recognition result character display portion within the verification screen form and a plurality of the read character image are displayed sequentially in a character image display portion adjacent or proximal to the recognition result character display portion and at a predetermined position of a character image list display portion. A plurality of character images are listed in the character image list display portion, in which the already displayed character images are shifted one position from the predetermined position and displayed.

4 Claims, 19 Drawing Sheets

[Figure 1]
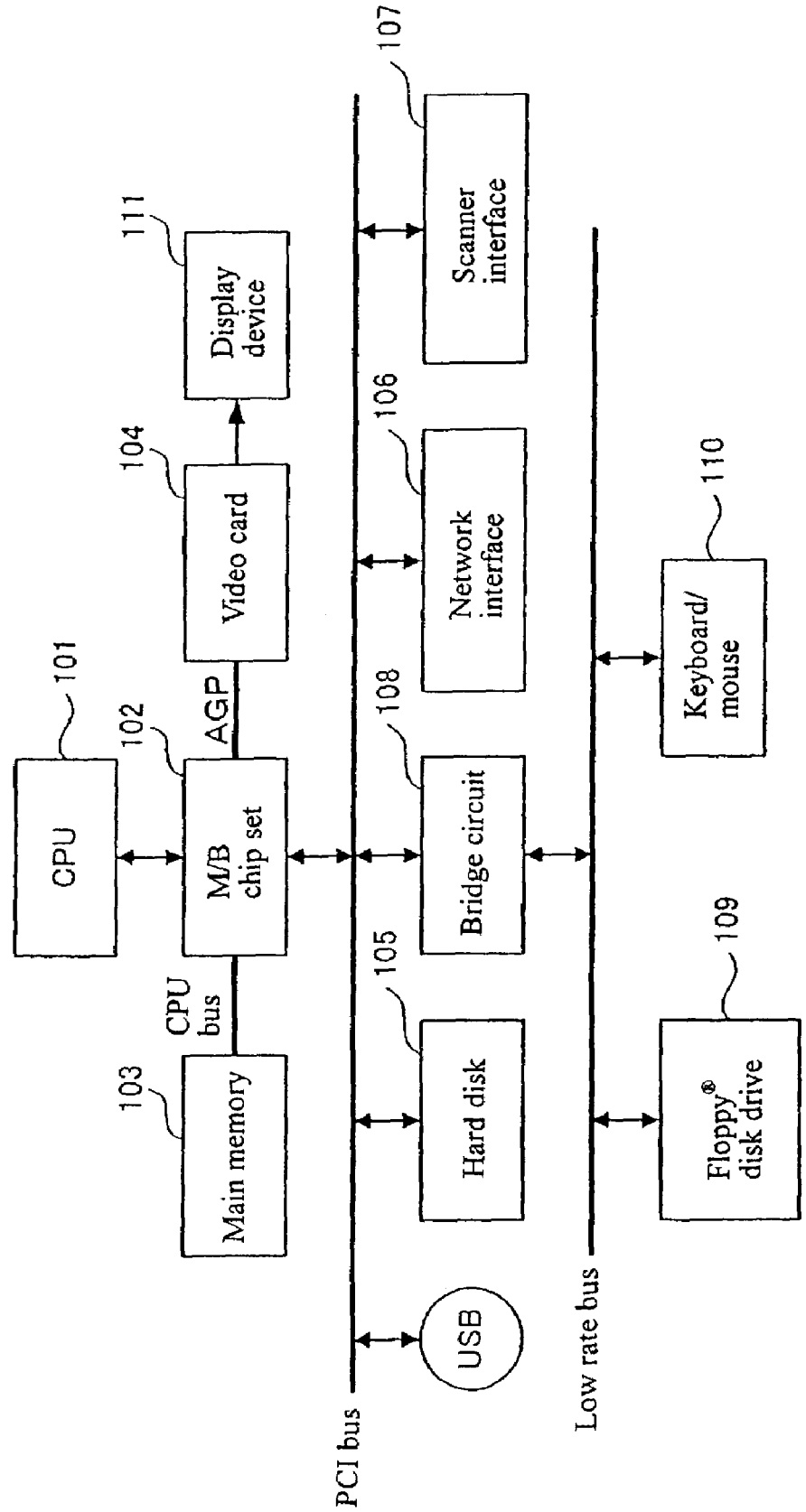

[Figure 2]
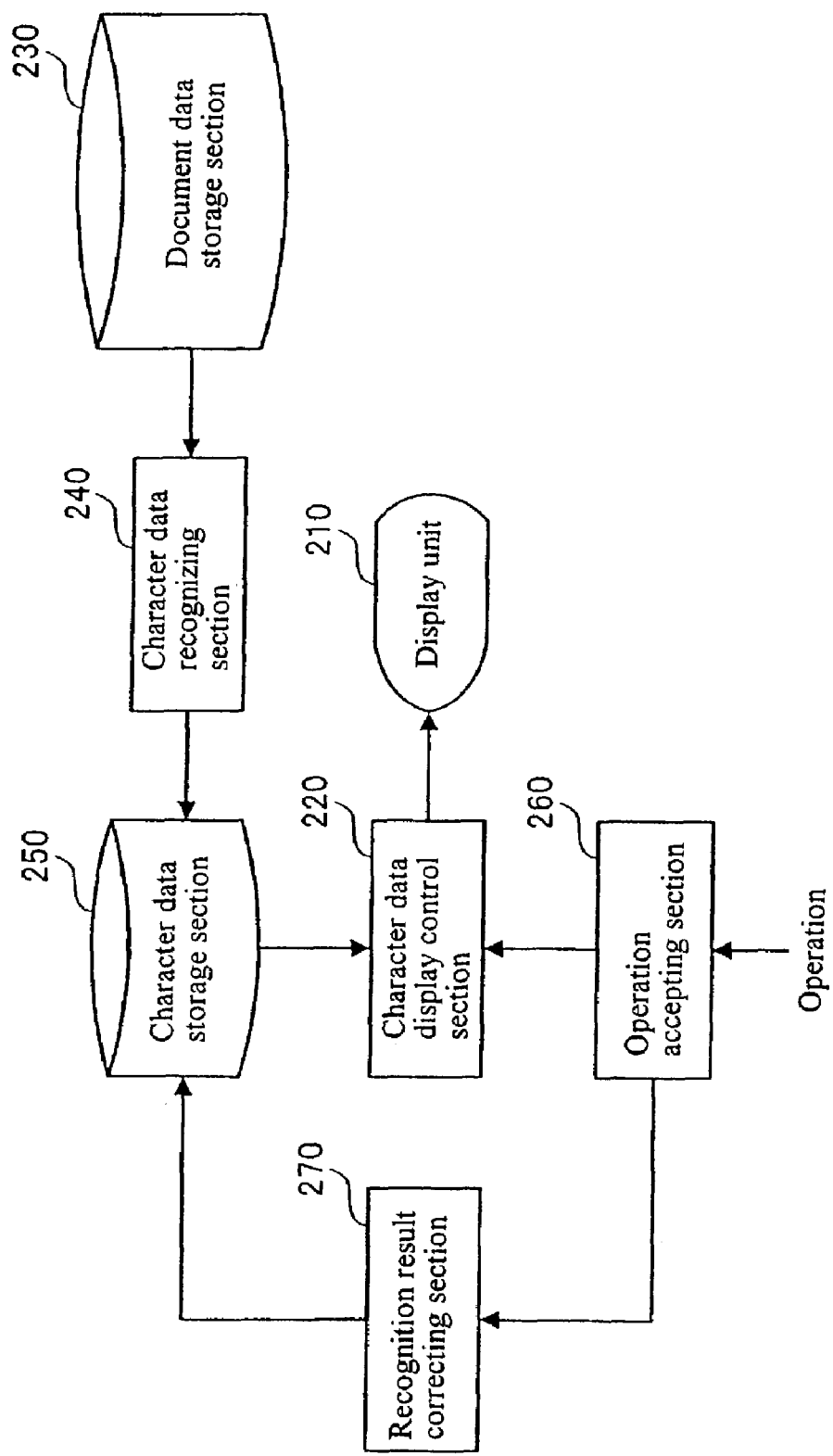

[Figure 3]
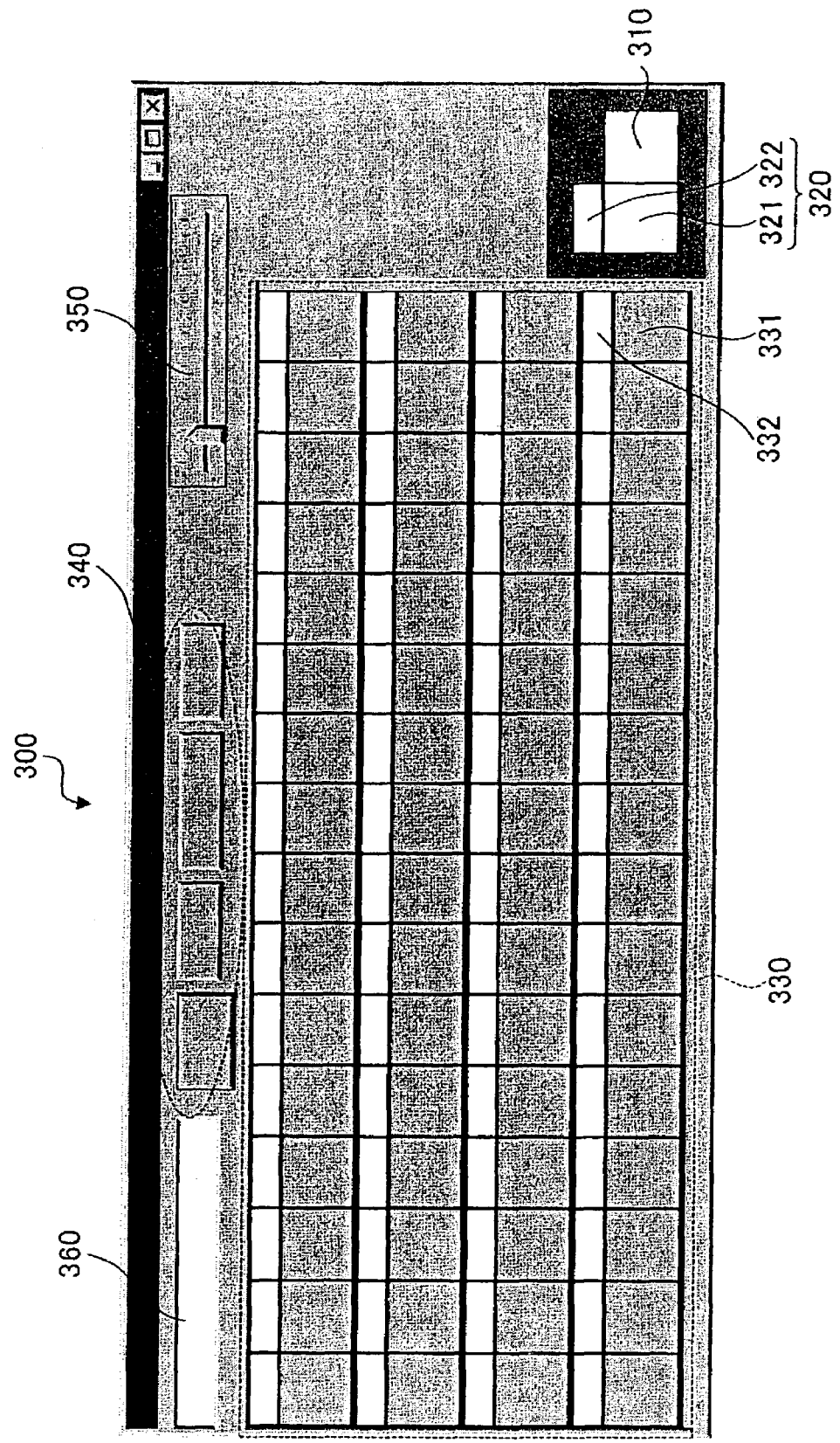

[Figure 4]
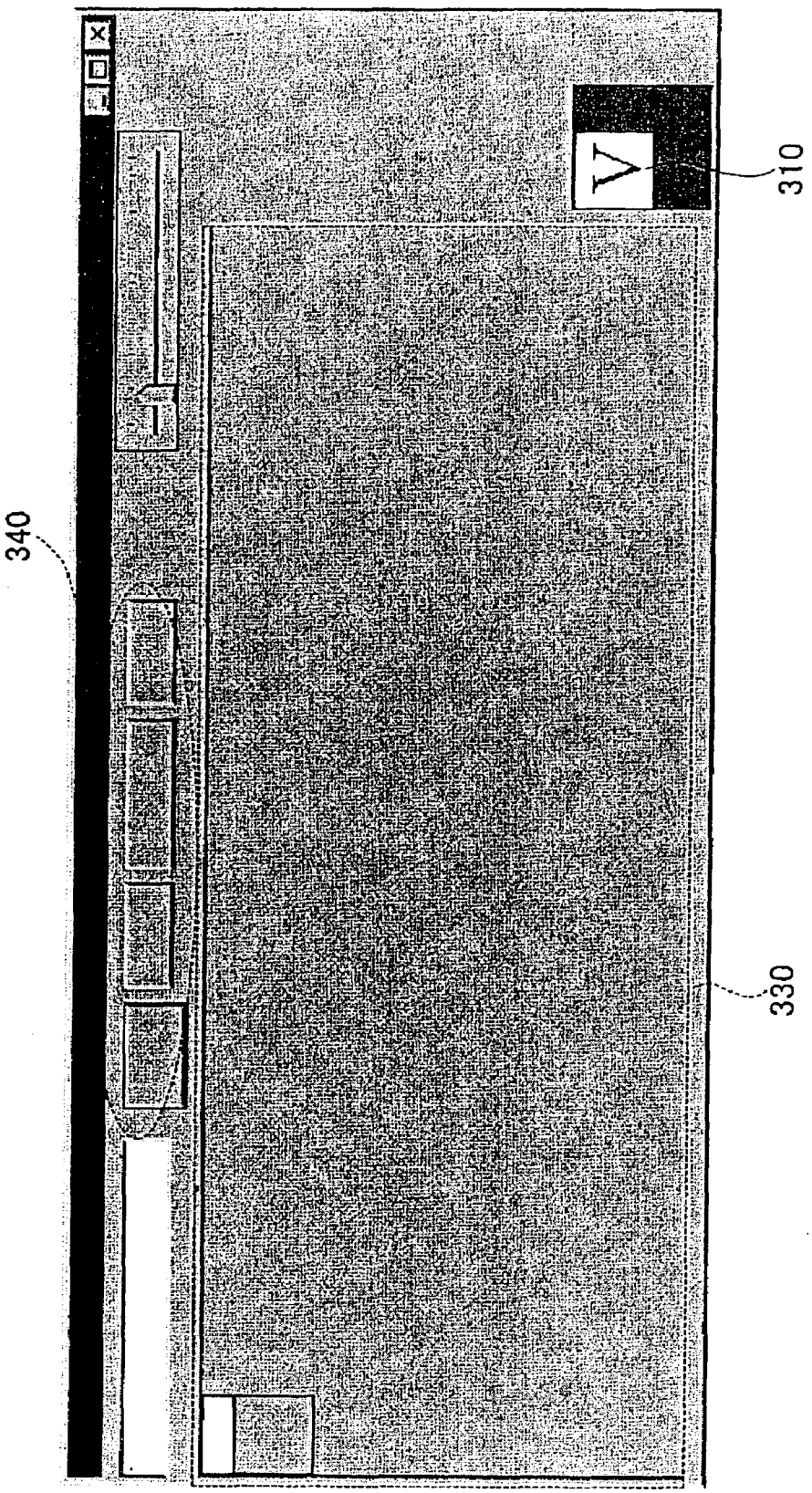

[Figure 5]
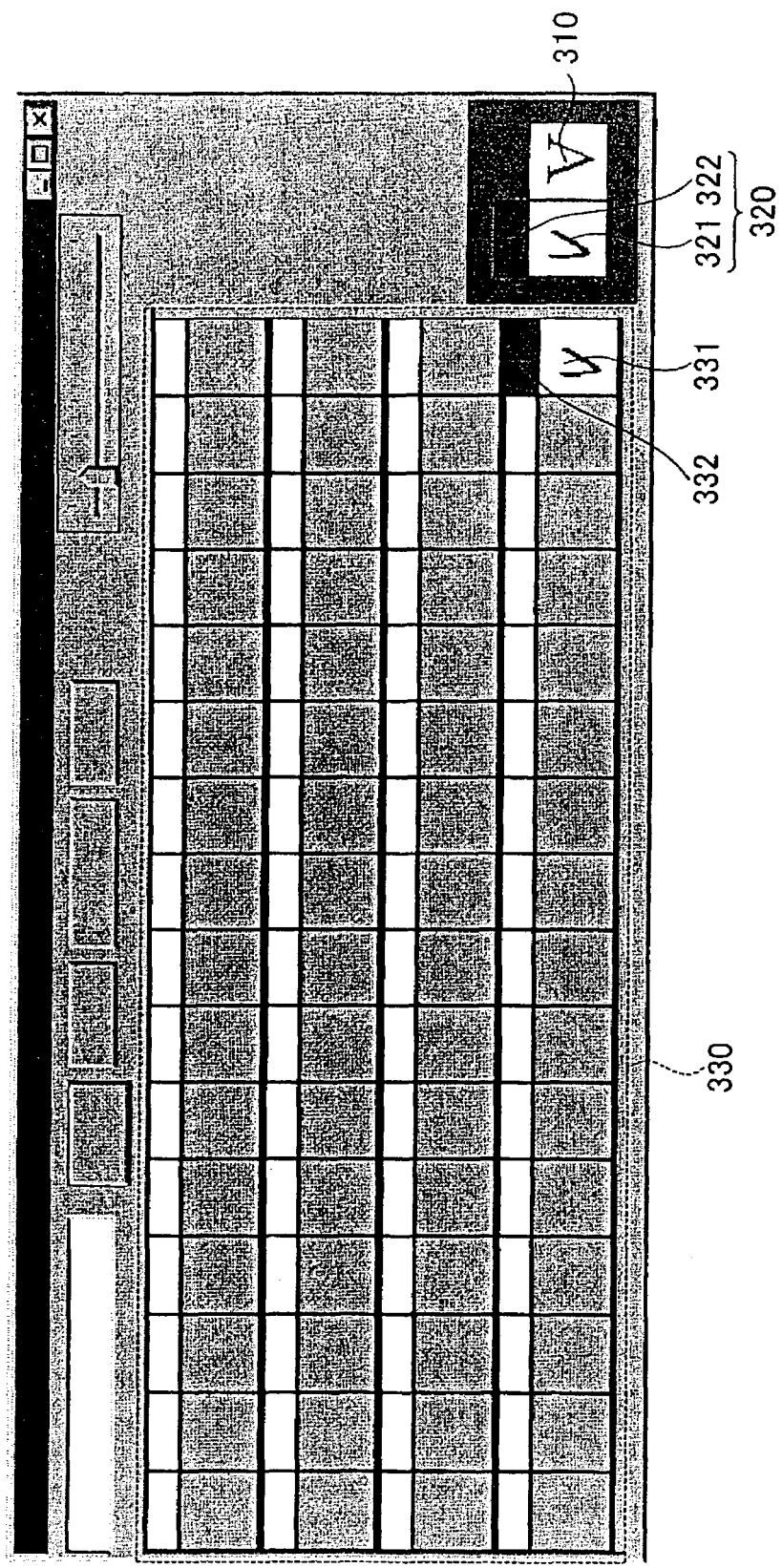

[Figure 6]
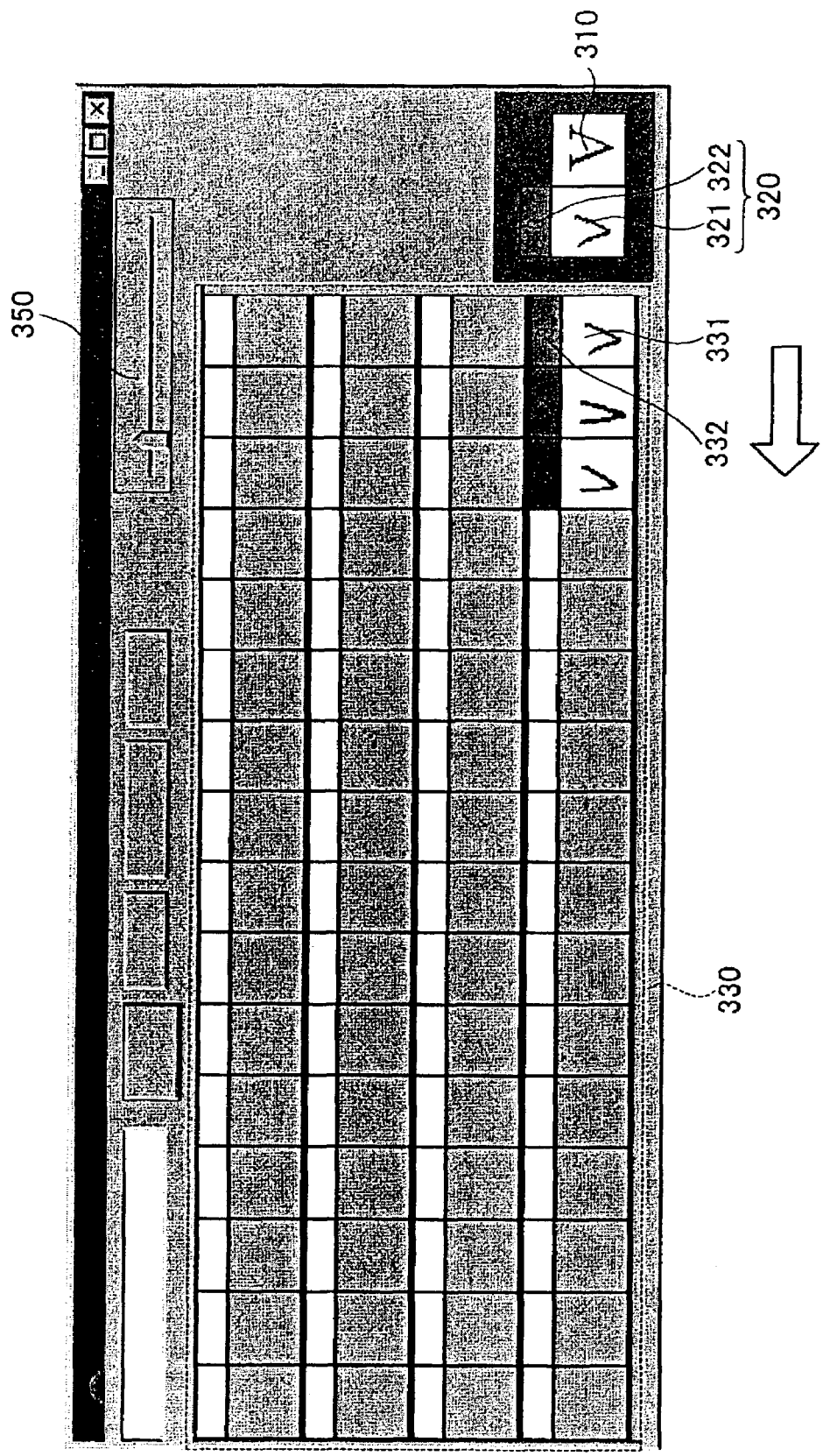

[Figure 7]
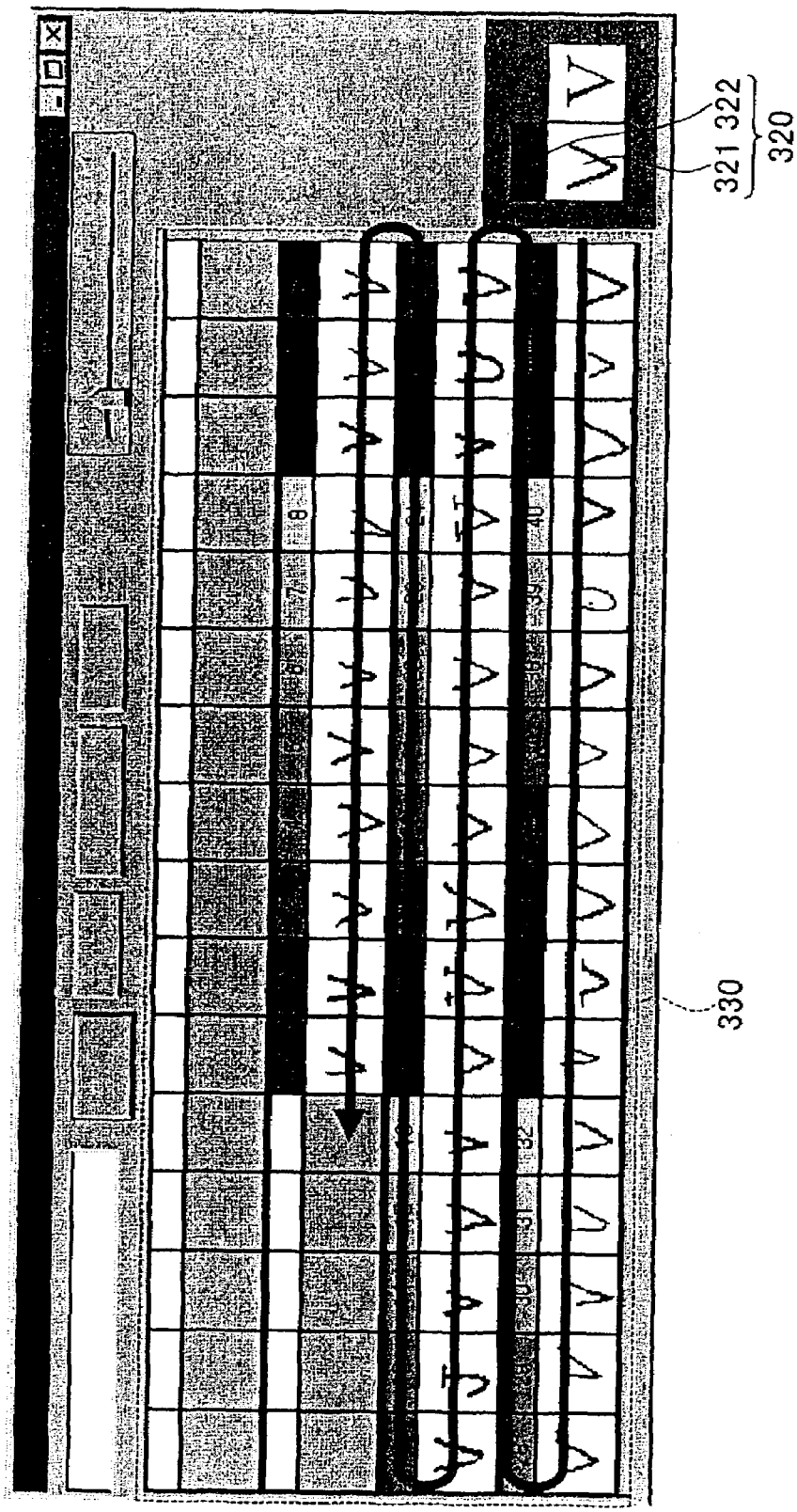

[Figure 8]
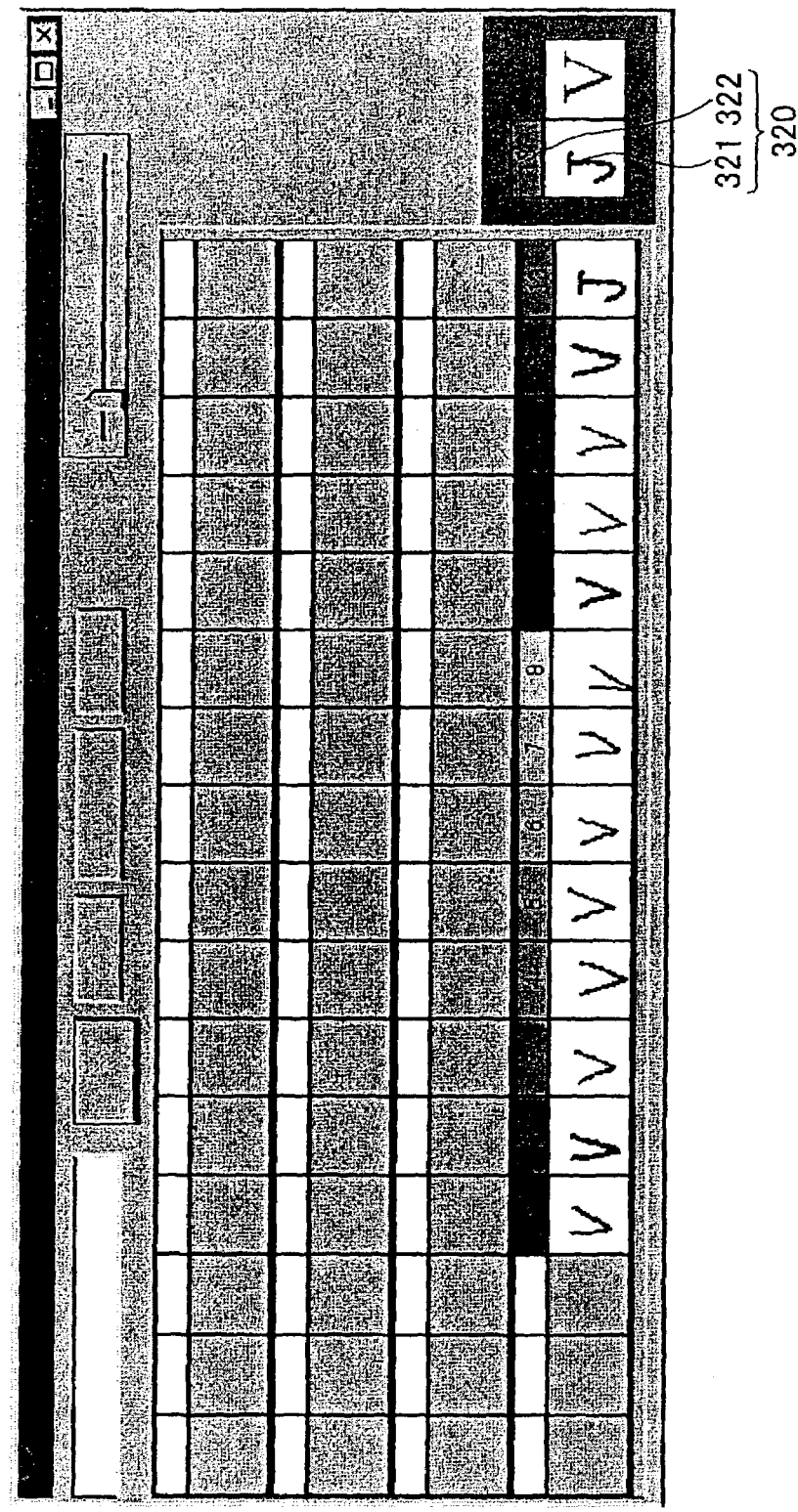

[Figure 9]
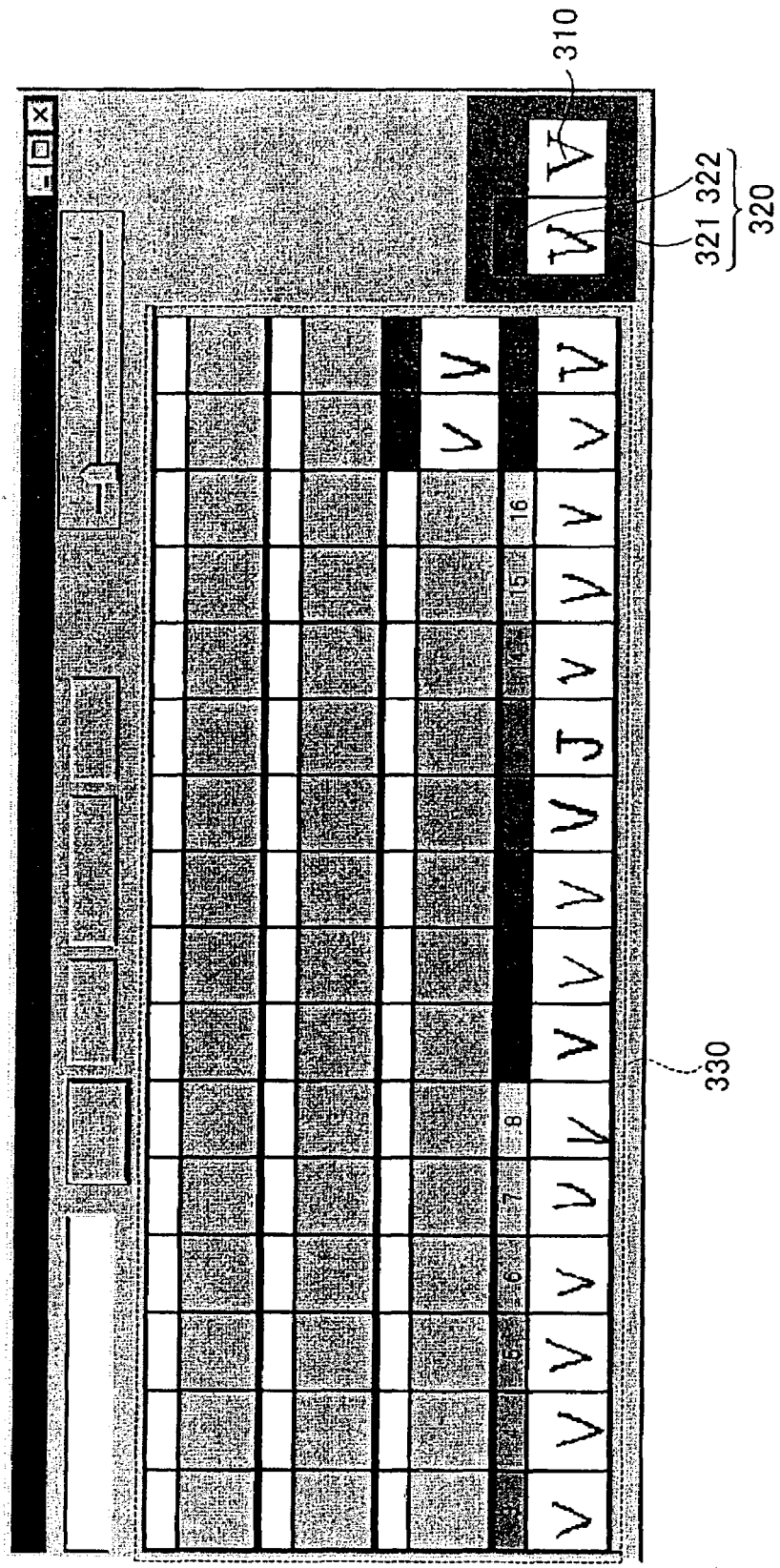

[Figure 10]
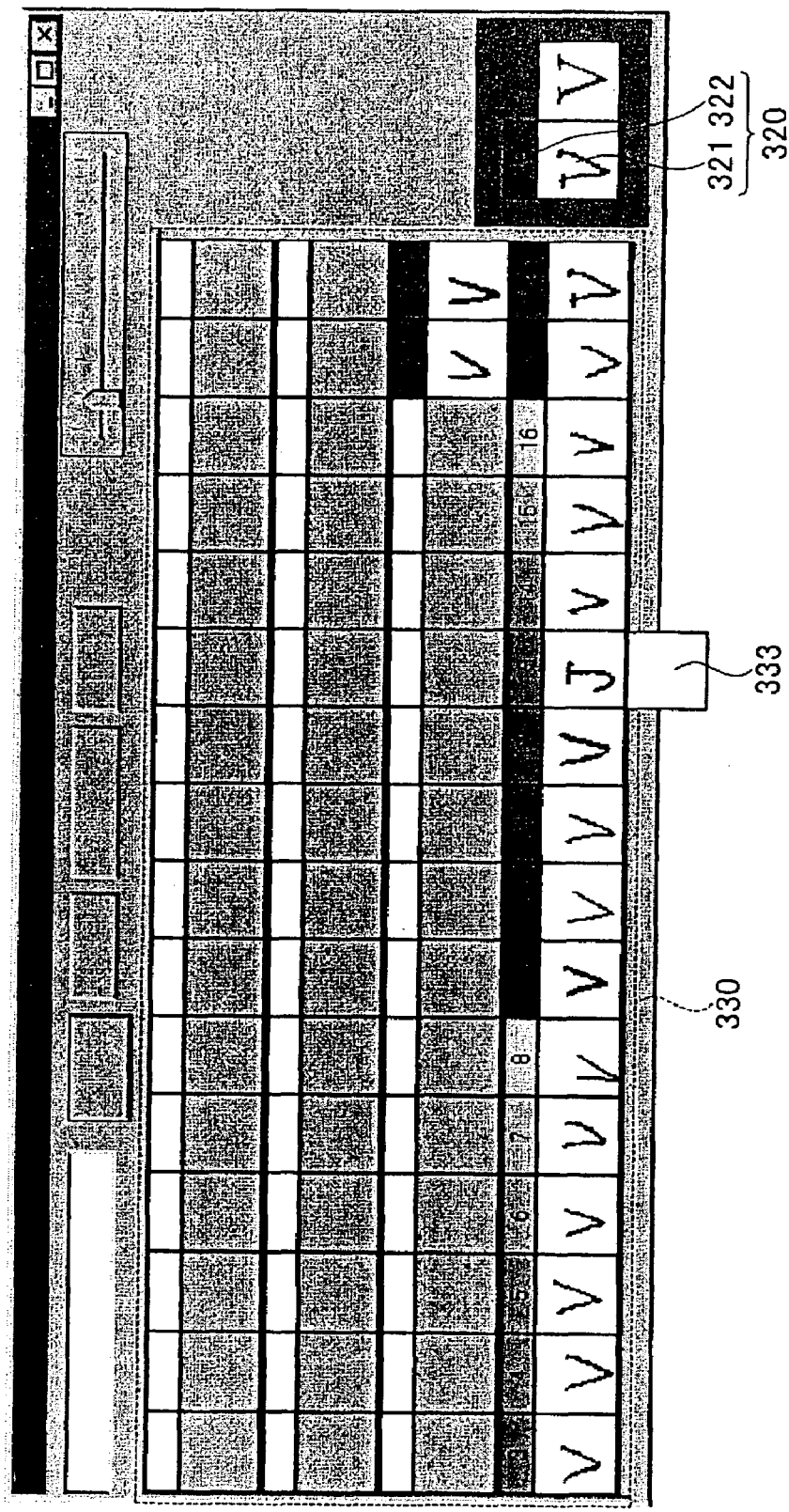

[Figure 11]
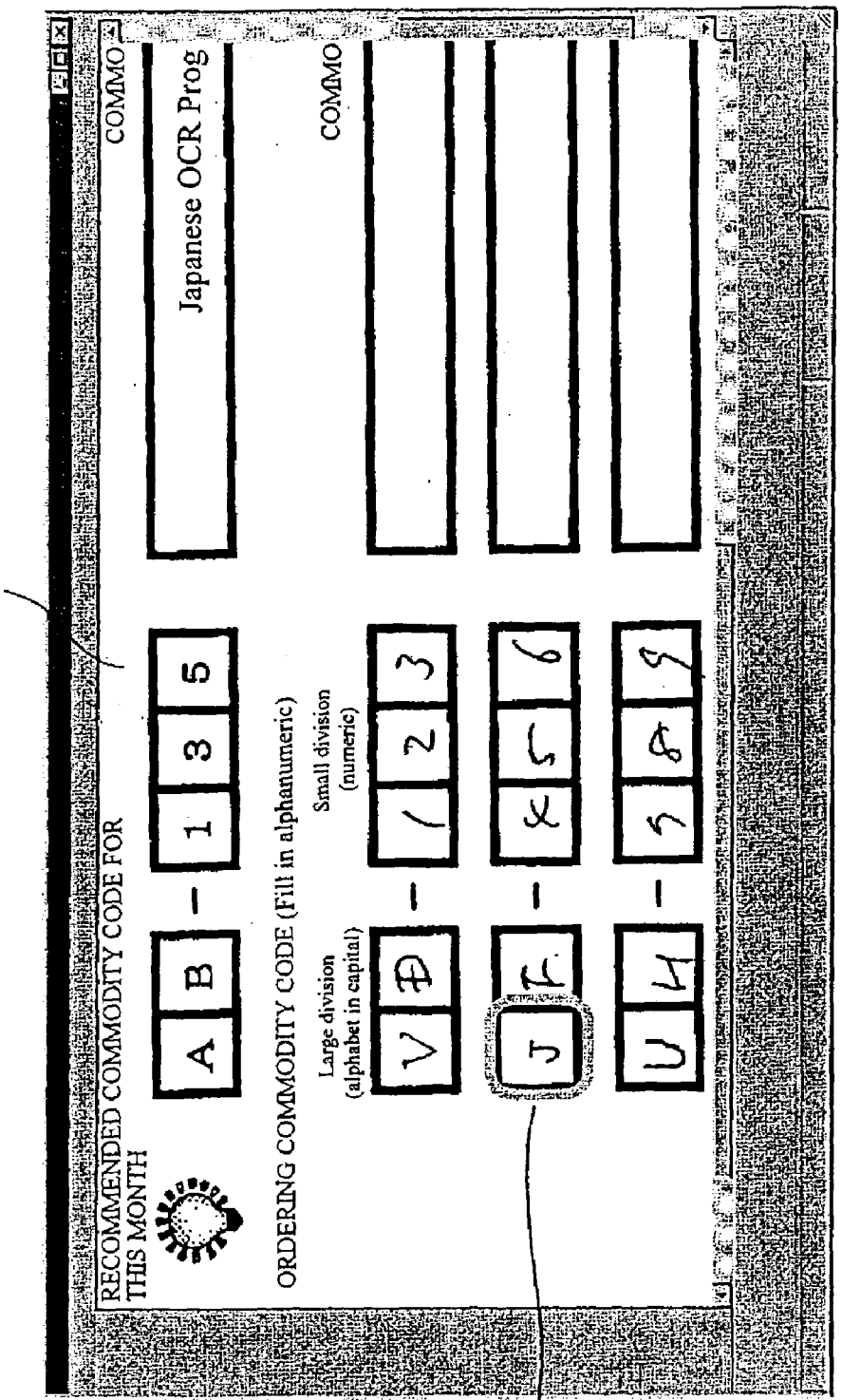

[Figure 12]
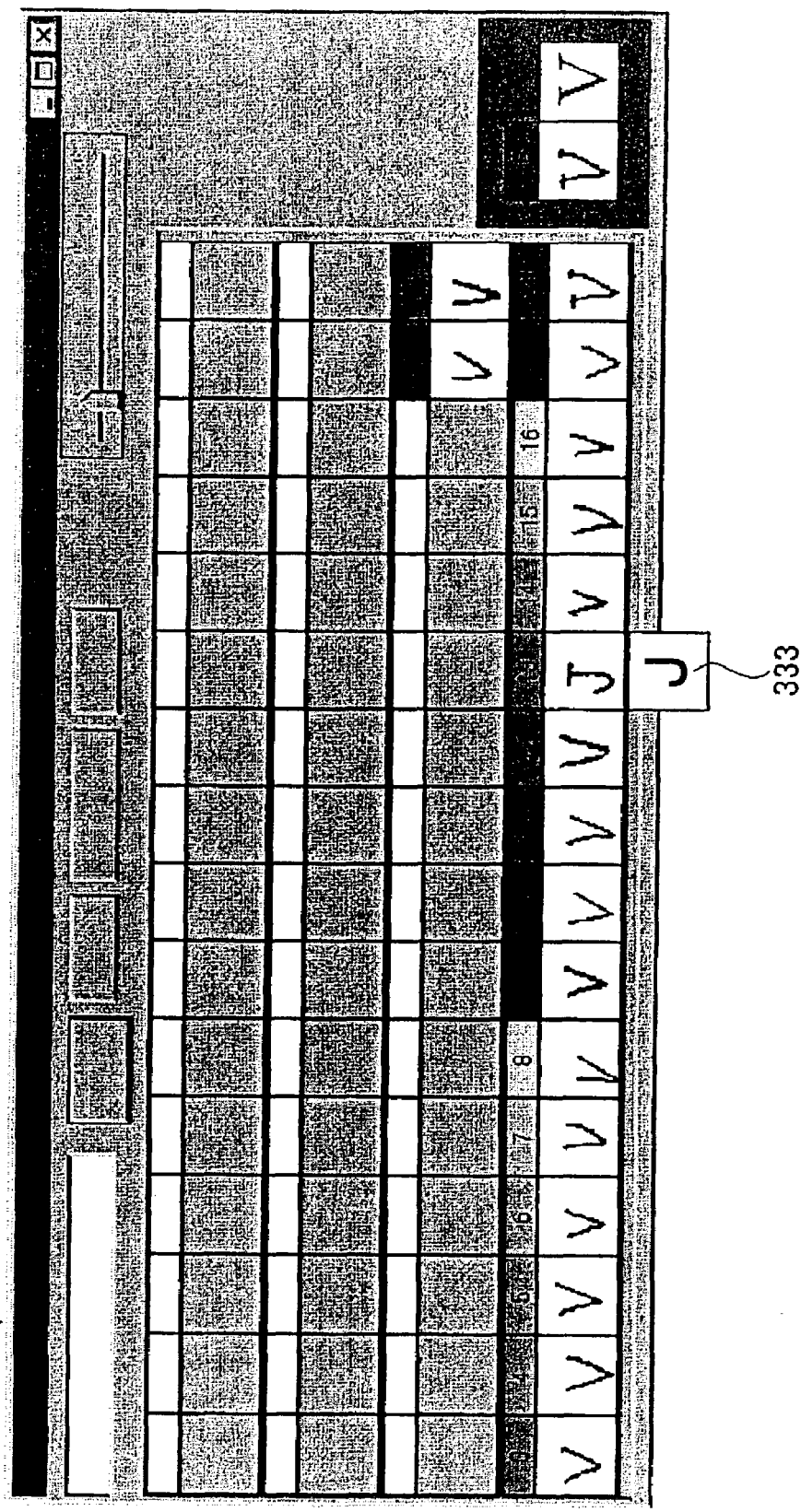

[Figure 13]
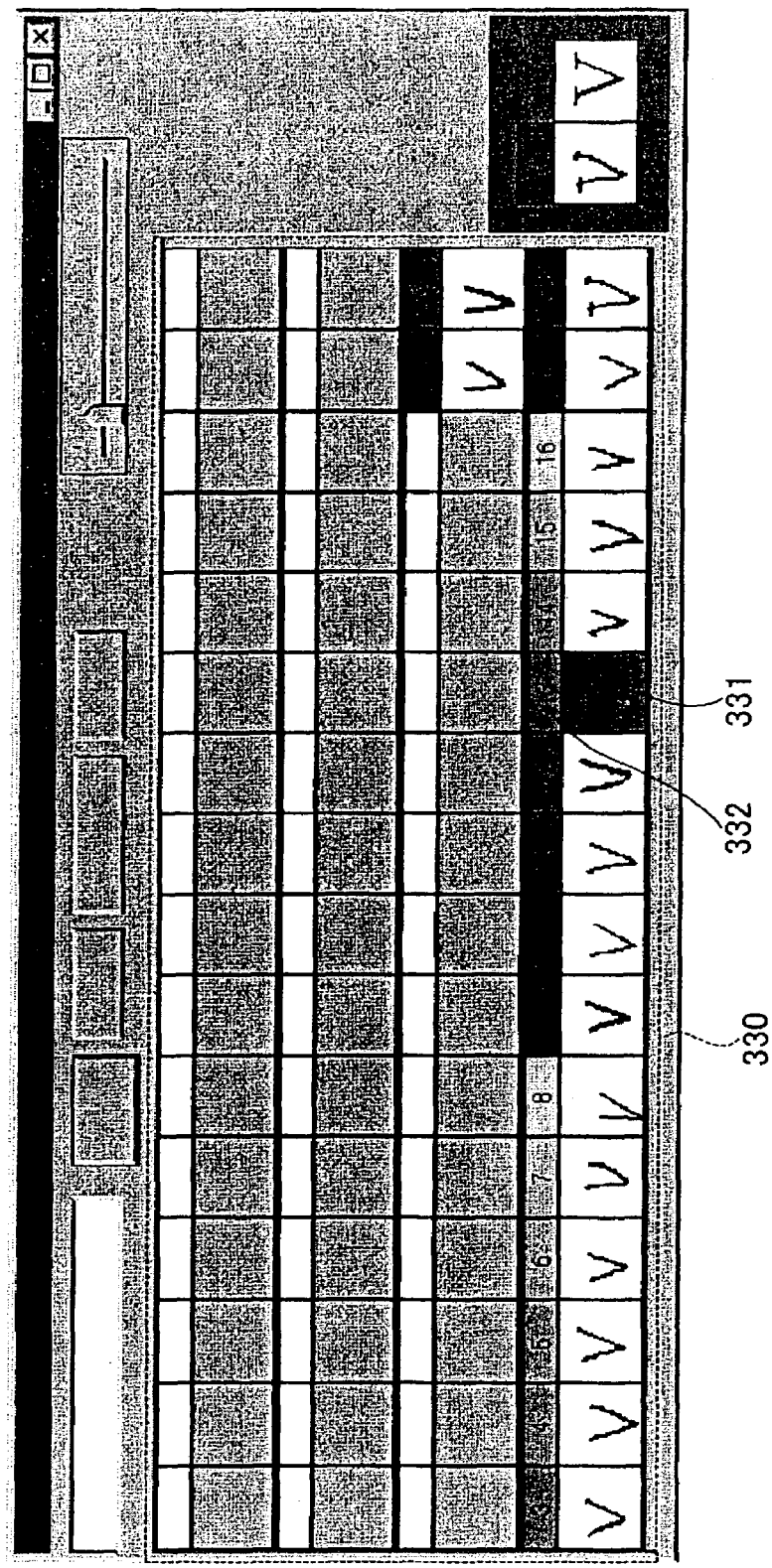

[Figure 14]
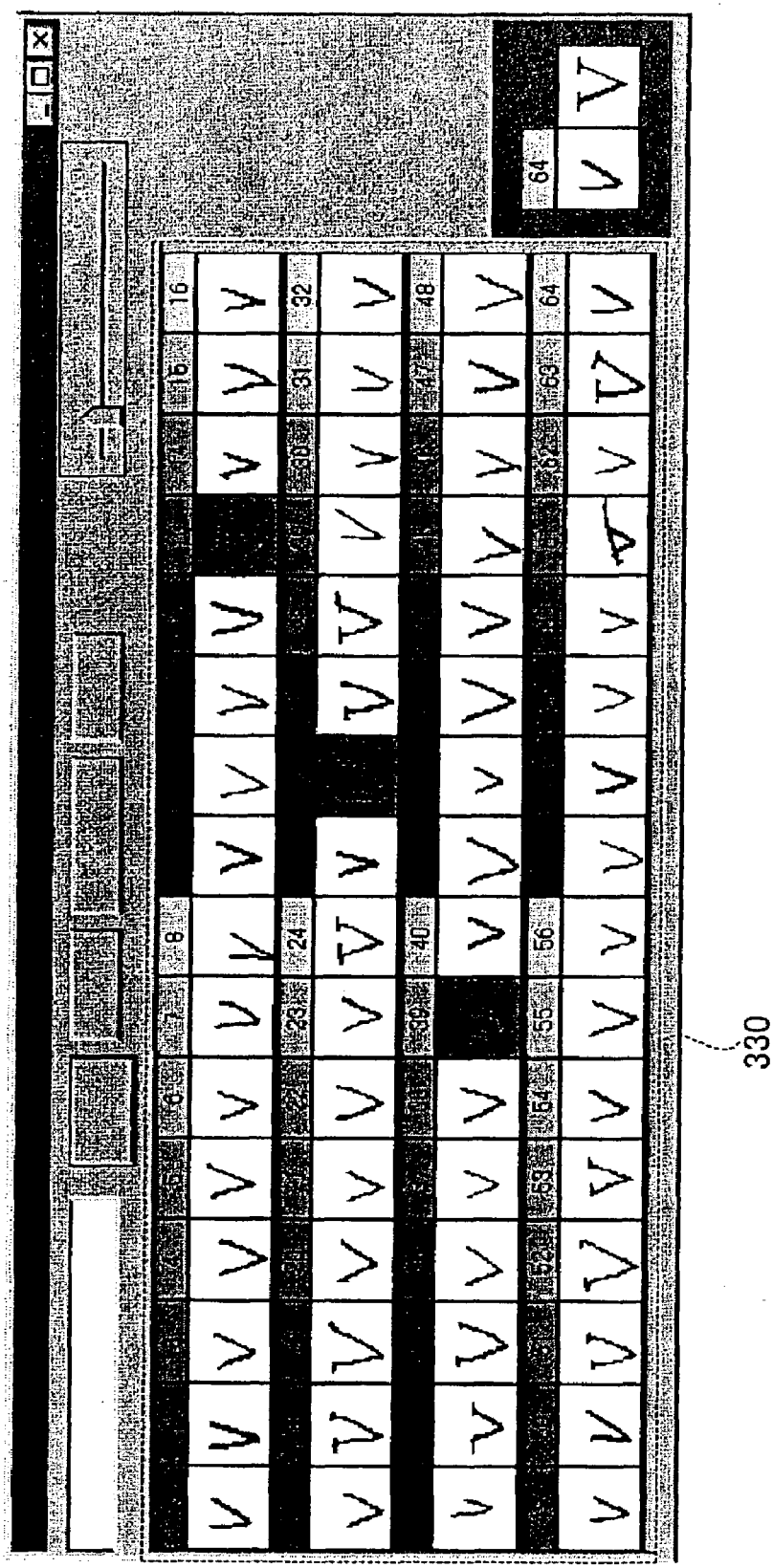

[Figure 15]
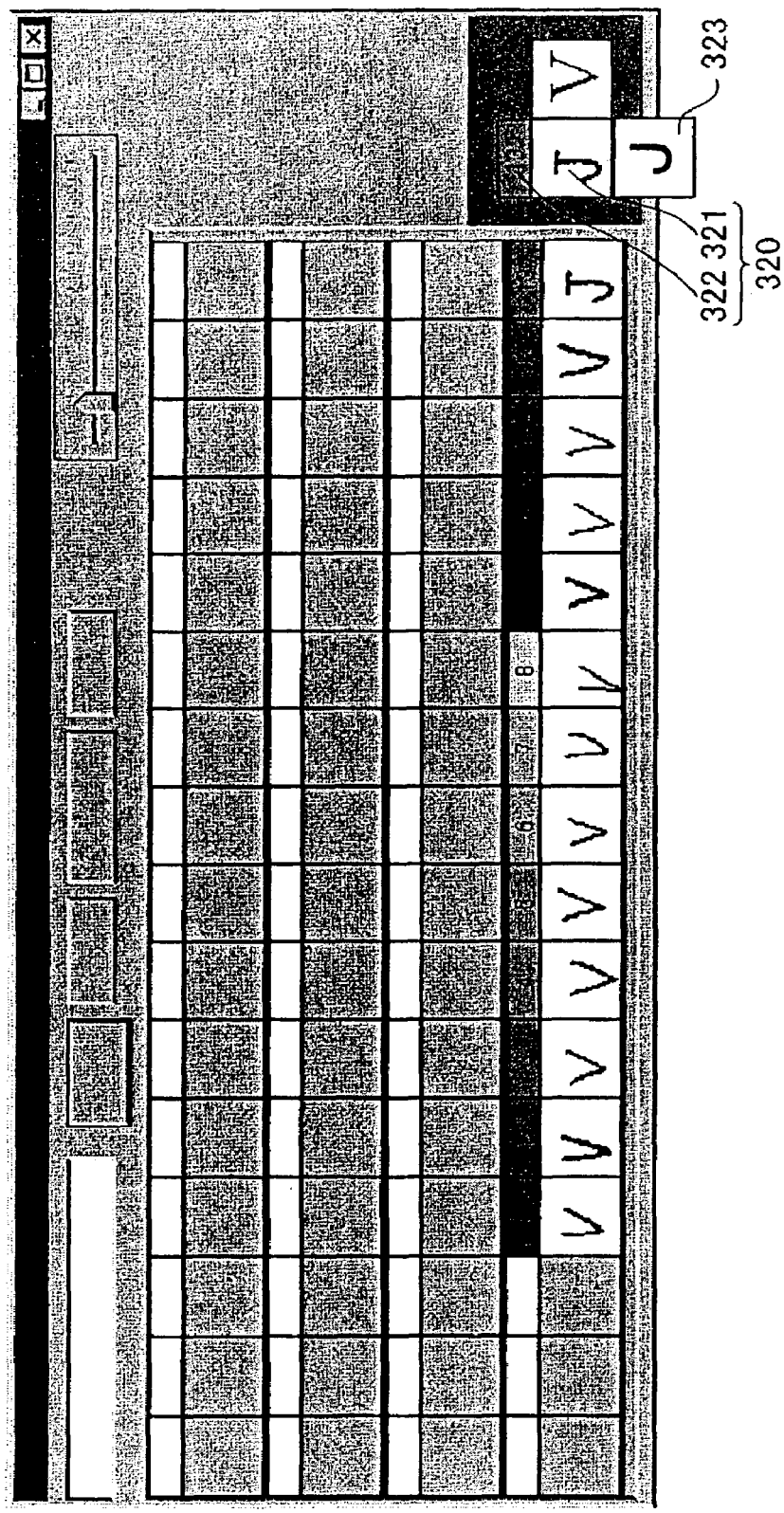

[Figure 16]
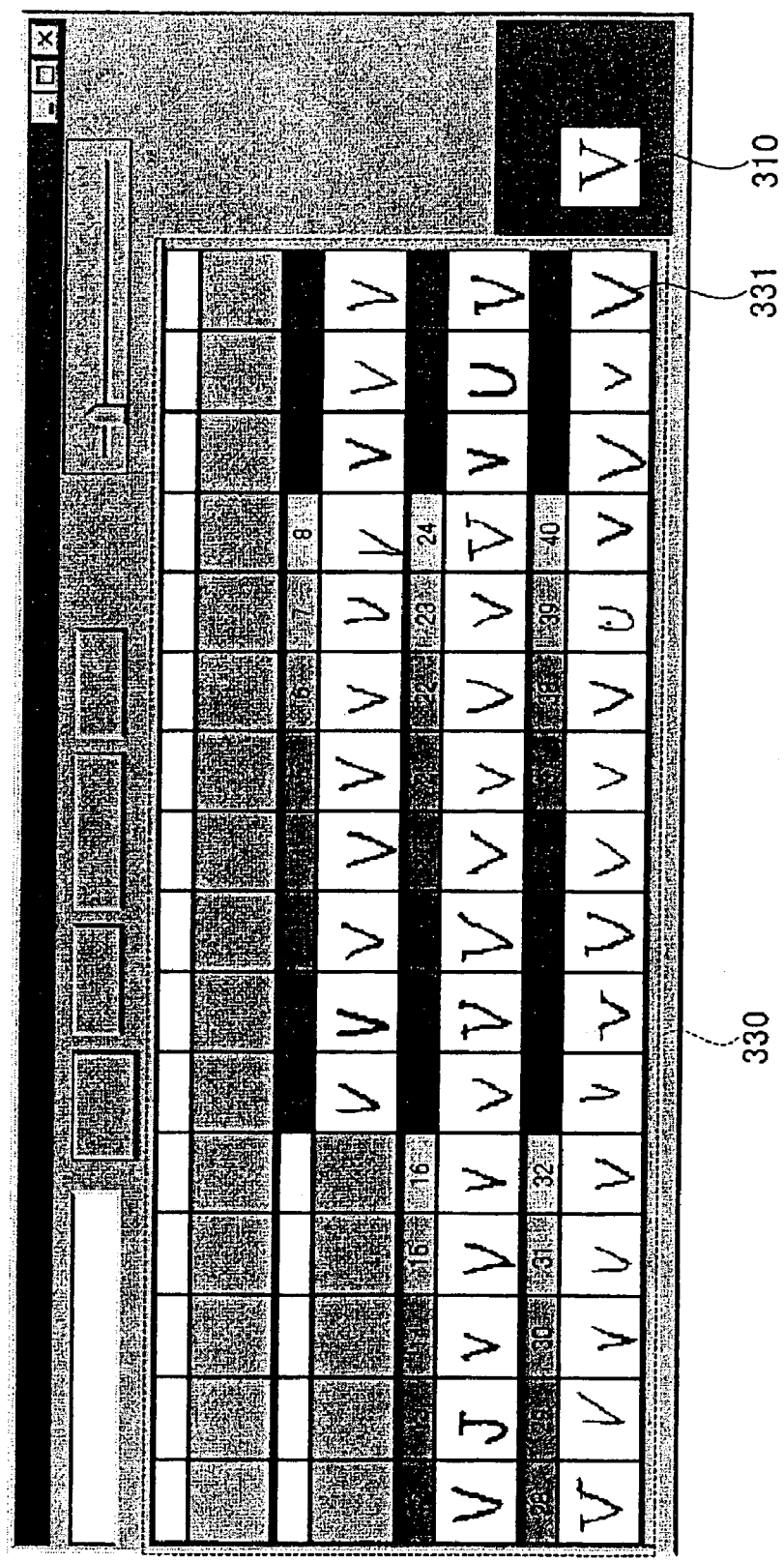

[Figure 17]
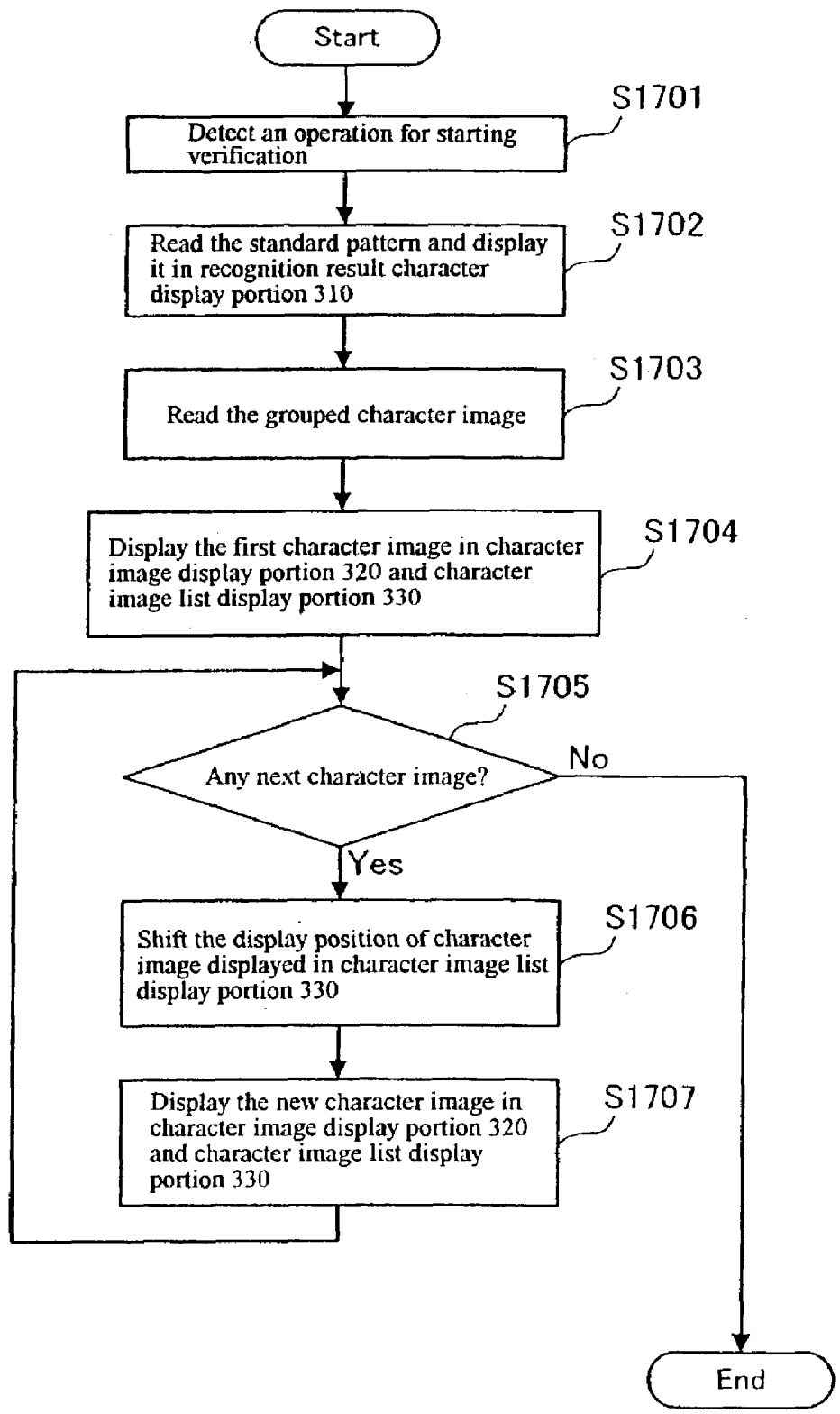

[Figure 18]
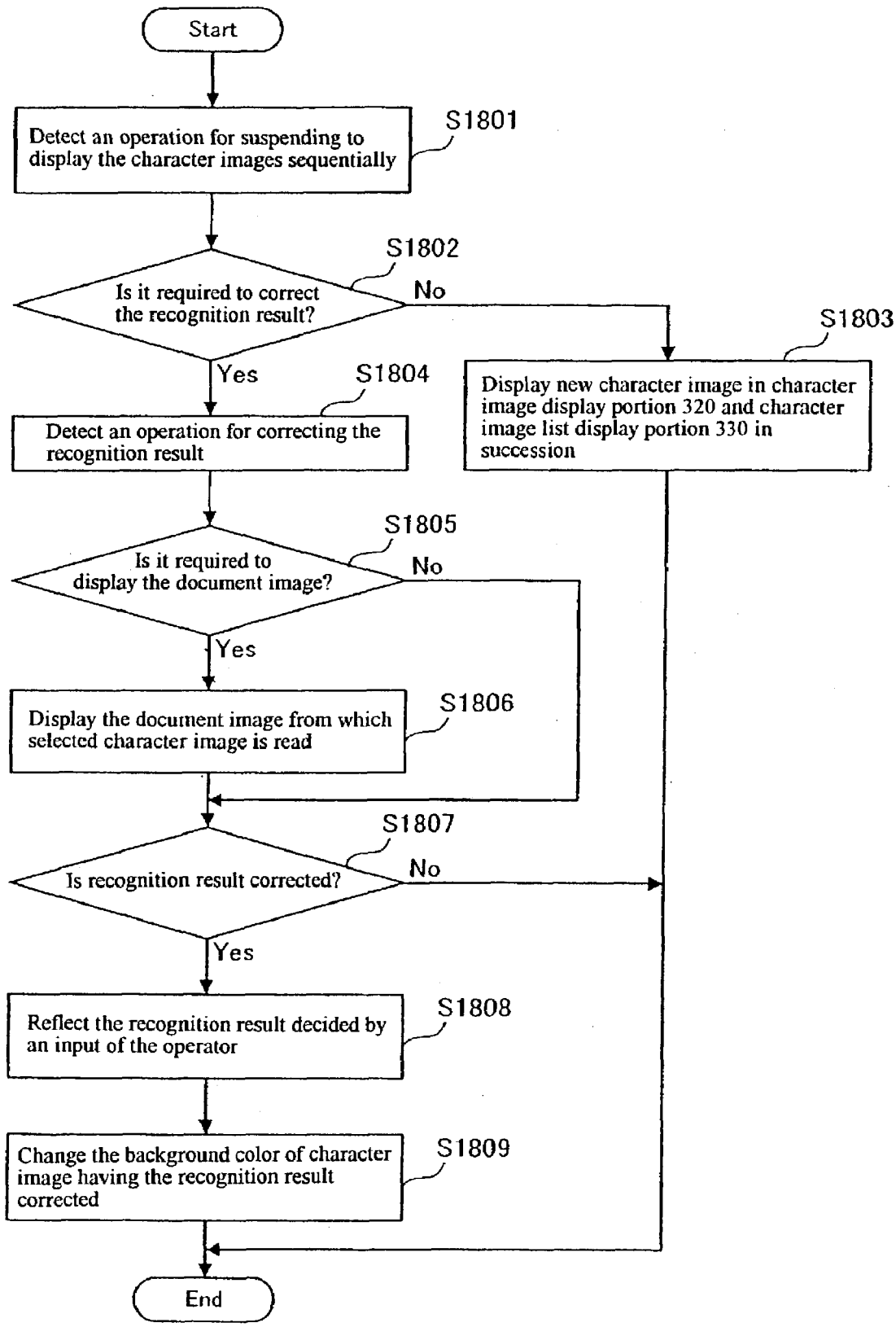

[Figure 19]
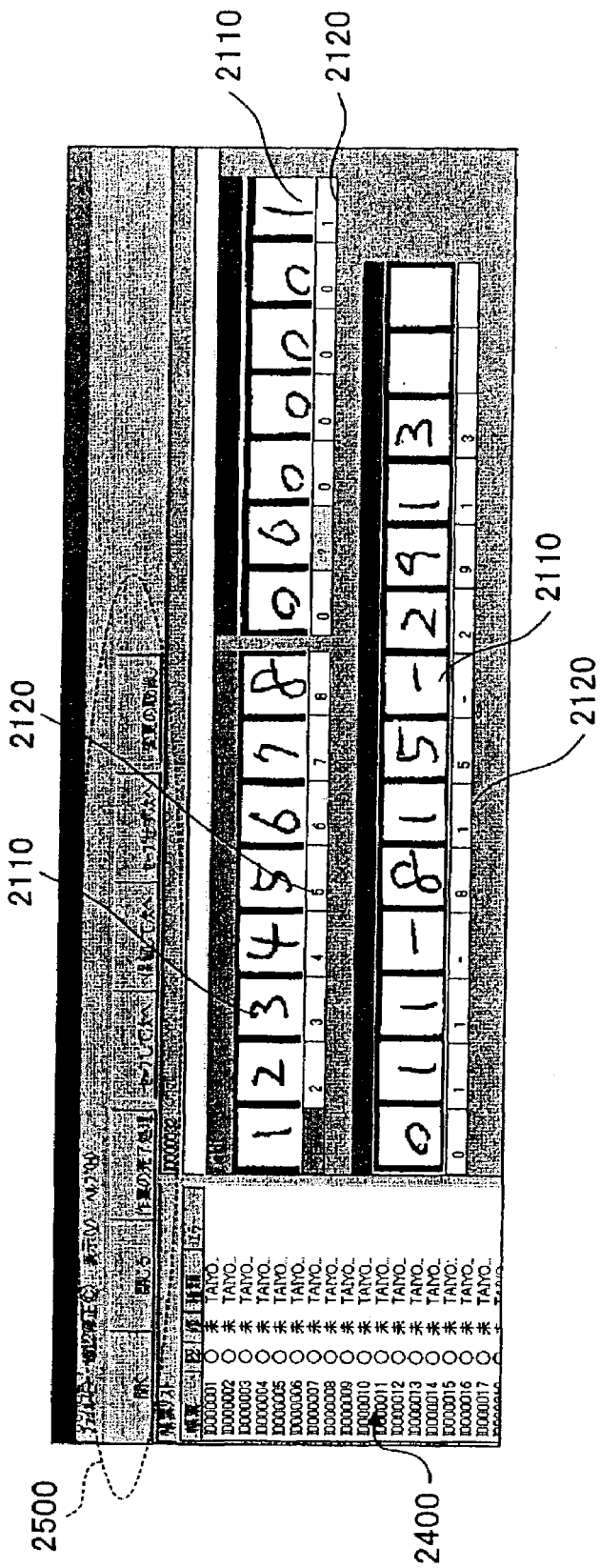

DISPLAY CONTROL METHOD, AND PROGRAM, INFORMATION PROCESSING APPARATUS AND OPTICAL CHARACTER RECOGNIZER

BACKGROUND OF THE INVENTION

1. Field of the Invention

The present invention relates to a method for controlling the display of a screen displayed on a display device of a computer, for example and, more particularly, to a method for verifying a read image on a screen by recognizing a character.

2. Background Art

One of the methods for reading a character or figure is an optical character recognition (hereinafter referred to as OCR). An OCR apparatus or a computer having the OCR function recognizes (specifies) a character or figure as a predetermined pattern by reading optically an image of the character or figure, and comparing it with the reference pattern. The OCR apparatus or computer of this type handles a large amount of different kinds of patterns, and may make an error recognition result. Therefore, the recognition result is checked through the visual inspection of the operator, and if mis-recognized, the recognition result must be corrected.

A typical user interface for use in comparing the character image and the recognition result character involves a combination of a display area of read character image and a display area of recognition result character (standard pattern).

FIG. 19 is a view showing an example of a verification screen for verifying the character image and the recognition result. As shown in FIG. 19, the verification screen is designed by arranging various display areas in a predetermined form. The character image read (hereinafter referred to as scanned) in accordance with a format of document and the recognition result of this character image are output to a predetermined area of this verification screen. In the illustrated example, a character image display area 2110 and a recognition result display area 2120 for displaying the recognition result of this character image are arranged in two rows in the verification screen.

Problems to be Solved by the Invention

In employing a business application for recognizing a character, outputting the recognition result and verifying the output result, the arrangement of GUI parts on the verification screen as the user interface greatly affects the efficiency of operator's verification operation. In the conventional verification screen, the operator had to compare the character image read from each field of the document and the recognition result for each character for verification. For each document, the user needed to read the character image and the recognition result and repeat the verification operation for each character. In this manner, a complex operation was required for verifying the recognition result. Namely, the verification operation by the operator was bad in the operation efficiency, and not expected to have high throughput.

To verify the character images arranged for each field and the recognition result, the operator must always move the line of sight up or down and left or right, so that the operator's eyes are very tired by repeating this movement for a long time.

A user interface may be provided in which a plurality of character images having the same recognition result can be arranged and compared with the recognition result character for verification. In this case, when the operator makes visual inspection, it is unnecessary to move the line of sight to the recognition result character for each character, whereby the burden is relieved. However, in the case of employing such a method, it is a burden for the operator to move the line of sight to all the character images, and there is a risk of the column skip or line skip during verification, resulting in a check error (missing check).

Thus, it is an object of the present invention to design a screen with the user interface in which the scanned character can be verified at higher productivity and with less burden and fatigue of the operator.

Also, it is another object of the invention to provide a method for controlling the display of a screen in which a difference between a scanned image and the recognition result can be discriminated intuitively and easily.

BRIEF SUMMARY OF THE INVENTION

In order to accomplish the above objects, the present invention is implemented as a method for controlling the display of a screen which allows the user to verify the recognition result of a symbol, employing a computer. That is, this display control method comprises a step of reading a plurality of symbol images recognized as a specific symbol stored in a memory upon an operation of the user, and a step of displaying sequentially the plurality of read symbol images on the verification screen of a display device. This display method further comprises a step of reading the standard pattern of the specific symbol stored in the memory upon an operation of the user, as well as displaying the standard pattern on the verification screen of the display device.

This display method comprises displaying a newly displayed symbol image and the already displayed symbol images in a list format in displaying the plurality of symbol images. Also, this display method comprises displaying the newly displayed symbol image at a predetermined position sequentially, and displaying the already displayed symbol images at the positions shifted each one column from the predetermined position, in displaying the plurality of symbol images.

Also, this invention is implemented as a program for executing a process for each step of the display control method on a computer. This program is provided by being stored in a magnetic disk, an optical disk, a semiconductor memory or other recording medium, or distributed via the network.

Through these processes, the display control can be suitably made to allow the user to verify the recognition result of the symbol, whereby the user can find the mis-recognized symbol image intuitively and easily.

Also, this invention to accomplish another object is implemented as an information processing apparatus that is configured in the following way. That is, an information processing apparatus for displaying the recognition result of figure on a predetermined screen comprises graphics image display means for displaying sequentially a recognized graphic image on the screen, and graphics image list display means for displaying the sequentially displayed graphics images in a list format on the screen. This information processing apparatus further comprises recognition result image display means for displaying the standard pattern indicating the recognized image at a predetermined position on the screen.

The display means can display the information at predetermined positions on the verification screen of the recognition result which is suitable for discriminating the mis-recognized graphics image.

Moreover, this invention is implemented as an information processing apparatus that is configured in the following way. That is, this information processing apparatus comprises a display unit for displaying a predetermined screen, a display control section for generating the screen for verifying the recognition result of a symbol and displaying the screen on the display unit, and an operation accepting section for accepting an operation made on the screen. And the display control section controls the display contents that are displayed in a symbol image display area for displaying a recognized symbol image sequentially and in a symbol image list display area for displaying the symbol image displayed in the symbol image display area and the symbol images already displayed in the symbol image display area. Also, this display control section controls the display contents that are displayed in a recognition result symbol display area for displaying the standard pattern indicating the recognized symbol. And the display control section shifts by one character the already displayed symbol images, every time a new symbol image is displayed at a predetermined position in the symbol image list display area.

This information processing apparatus further comprises a recognition result correcting section for correcting the recognition result of the symbol image displayed on the display unit, a symbol data storage section for storing and managing the symbol images grouped for every symbol code of the recognition result, and a document data storage section for storing and managing a document image from which the symbol image stored in the symbol data storage section is read.

Moreover, this invention is implemented as an optical character recognizer that is configured in the following way. This optical character recognizer comprises character recognition means for recognizing a character image as a character, display means for displaying a predetermined screen providing a user interface, and display control means for controlling the display of the screen to be displayed on the display means. Herein, the display means displays a pair of display portions arranged at predetermined positions within the screen and a list display portion, and the display control means displays the standard pattern indicating the recognized character on one of the pair of display portions, and displays sequentially a recognized character image in the other of the pair of display portions and at a predetermined position of the list display portion.

In this optical character recognizer, the pair of display portions are arranged adjacent to each other, and the list display portion is arranged near the pair of display portions. And this display control means displays sequentially a character image at a position of the list display portion divided into a matrix that is closest to the pair of display portions, and displays the already displayed character images in the list display portion at the positions becoming more distant from the pair of display portions as more character images are displayed sequentially. Also, this display control means may display a plurality of pairs of display portions.

Herein, a part of the display portion for displaying the character image has a colored region displayed in color. And this display control means changes the color of the colored region in gradation for every predetermined number of images as more character images are displayed sequentially. Moreover, a part of the display portion for displaying the character image has a sequential number display region for displaying the number. And the display control means changes the number displayed in the sequential number display region as more character images are displayed sequentially.

BRIEF DESCRIPTION OF THE SEVERAL VIEWS OF THE DRAWINGS(S)

FIG. 1 is a block diagram typically showing an example of the hardware configuration of a computer suitable for implementing a verification system for the OCR recognition result according to an embodiment of the present invention;

FIG. 2 is a block diagram for explaining the functions of the verification system for the OCR recognition result according to the embodiment of the invention;

FIG. 3 is a view showing an example of a verification screen displayed on a display unit in this embodiment;

FIG. 4 is a view showing a state in which the verification screen is initiated;

FIG. 5 is a view showing a state of the verification screen when the verification operation is started;

FIG. 6 is a view showing a state of the verification screen in which a plurality of character images are displayed in the course of verification operation;

FIG. 7 is a view showing a state of the verification screen in which more character images are displayed than in the state of FIG. 6;

FIG. 8 is a view showing a state of the verification screen where a mis-recognized character image is displayed in a character image display portion;

FIG. 9 is a view showing a state of the verification screen where the mis-recognized character image is displayed in a character image list display portion;

FIG. 10 is a view showing a state of the verification screen in correcting the recognition result of the mis-recognized character image that is displayed in the character image list display portion;

FIG. 11 is a view showing an example of a document image screen displayed on the display unit;

FIG. 12 is a view showing a state of the verification screen where the recognition result of the mis-recognized character image is corrected;

FIG. 13 is a view showing a state of the verification screen after the recognition result of the character image is corrected;

FIG. 14 is a view showing a state of the verification screen after the recognition results of a plurality of character images are corrected;

FIG. 15 is a view showing another example of the verification screen in correcting the recognition result of the mis-recognized character image;

FIG. 16 is a view showing another example of the verification screen displayed on the display unit;

FIG. 17 is a flowchart showing the flow of a process for displaying the verification screen in this embodiment;

FIG. 18 is a flowchart showing the flow of a process for correcting the recognition result in this embodiment; and FIG. 19 is a view showing one example of the conventional verification screen for verifying the character image and the recognition result.

DETAILED DESCRIPTION OF THE INVENTION

The preferred embodiments of the present invention will be described below in detail with reference to the accompanying drawings.

DESCRIPTION OF SYMBOLS

101 CPU
102 M/B chip set
103 Main memory
104 Video card
105 Hard disk
106 Network interface
107 Scanner interface
108 Bridge circuit
109 Floppy☐ disk drive
110 Keyboard/mouse
111 Display device
210 Display unit
220 Character data display control section
230 Document data storage section
240 Character data recognition section
250 Character data storage section
260 Operation accepting section
270 Recognition result correcting section
300 Verification screen form
310 Recognition result character display portion
320 Character image display portion
321 Character image verifying portion
322 Image number display portion
323 Text input portion
330 Character image list display portion
331 Character image verifying portion
332 Image number display portion
333 Text input portion
340 Operation button group
350 Display rate changing portion
360 Text display portion
400 Document image screen
410 Character recognition field First of all, the present invention will be outlined. In this invention, an entire image of a document is read by scanning the entire document where characters are written by manuscript in some fields. And characters in each field of the document read as the image are discriminated on the basis of a list of recognition result for making the character recognition, whereby each character is recognized as a specific character. The character images recognized as the specific characters are recorded collectively for every character code of the recognition result (hereinafter grouped for every recognition result). When the operator verifies the recognition result, the recognition result character is displayed at a predetermined position on a screen for verifying the recognition result of OCR (hereinafter referred to as a verification screen), and the character images recognized as this recognition result character are displayed sequentially at the position neighboring the position where the recognition result character is displayed. In this case, the displayed character image is added to a predetermined region of the screen, and displayed by being moved (shifted) sequentially every time a new character image is displayed. In other words, since the character images recognized as the same character appearing sequentially are verified (checked) continuously, the operator can determine intuitively and easily whether or not the recognition result character displayed on the verification screen and the character image are different (i.e., the recognition result is false). And the operator can correct the recognition result on the basis of the displayed character image. In this manner, a verification system which allows the operator to verify easily the scanned recognition result can be implemented by controlling the display of a GUI area.

FIG. 1 is a block diagram typically showing an example of the hardware configuration of a computer suitable for implementing the verification system for the OCR recognition result according to an embodiment of the present invention.

The computer as shown in FIG. 1 comprises a CPU (Central Processing Unit) 101 as computing means, a main memory 103 connected via a CPU bus to an M/B (Mother Board) chip set 102 and the CPU 101, a video card 104 connected via an AGP (Accelerated Graphics Port) to the M/B chip set 102 and the CPU 101, a display device 111 for displaying the graphic data generated in the video card 104, a hard disk 105 connected via a PCI (Peripheral Component Interconnect) to the M/B chip set 102, a network interface 106 and a scanner interface 107 through which the image data read (scanned) by an OCR, not shown is transmitted, and a Floppy☐ disk drive 109 and a keyboard/mouse 110 connected via a low speed bus such as an ISA (Industry Standard Architecture) bus to a bridge circuit 108 and further via the PCI bus to the M/B chip set 102. The display device 111 may be a liquid crystal display (LCD) or a CRT display.

FIG. 1 is only an example of the hardware configuration of the computer for implementing this embodiment of the invention. Other various configurations may be taken so far as this embodiment is applicable. For example, instead of providing the video card 104, a video memory may be only mounted to process the image data in the CPU 101, a sound mechanism may be provided to make the input/output by voice, or a CD-ROM (Compact Disc Read Only Memory) or DVD-ROM (Digital Versatile Disc Read Only Memory) drive may be provided via the interface such as ATA (AT Attachment).

In the hardware configuration as shown in FIG. 1, the data from the OCR having the scanner interface 107 connected outside is received, but if the OCR device is provided with the same hardware configuration, the hardware configuration of this embodiment may be employed for the OCR device itself.

FIG. 2 is a block diagram for explaining the functions of the verification system for the OCR recognition result according to the embodiment of the invention.

In FIG. 2, the verification system of this embodiment comprises a display unit 210 for displaying the verification screen for verifying the OCR recognition result, a character data display control section 220 for controlling the display of each area (GUI area for displaying the verification form and the character image and recognition result character arranged within this verification form) in the display unit 210, a document data storage section 230 for storing the scanned image data, a character data recognizing section 240 for reading the image data from the document data storage section 230 and recognizing the character data written in a predetermined area of the image data, a character data storage section 250 for storing the character data grouped for every recognition result of the character image recognized as the specific character, an operation accepting section 260 for calling various functions of the verification screen on the basis of an operation of the operator (by detecting the operation), and a recognition result correcting section 270 for correcting the recognition result of character image in accordance with the operation of the operator accepted by the operation accepting section 260.

In the system configuration as shown in FIG. 2, the display unit 210 is realized by a display screen of the display device 111 for displaying the graphic data generated by the video card 104 on the verification screen. The character data display control section 220, the character data recognizing section 240, the operation accepting section 260 and the recognition result correcting section 270 are software blocks that are implemented by the CPU 101 under the program control as shown in FIG. 1. A control program for the CPU 101 realizing these functions is provided by being stored in a magnetic disk, an optical disk, a semiconductor memory or other storage medium, or distributed via the network. The program is then read into the main memory 103. Also, the document data storage section 230 and the character data storage section 250 are realized in the main memory 103. The data or program held in the main memory 103 may be saved into the hard disk 105 or other recording devices, as needed.

In this embodiment, the scanned image data of the document is stored in the document data storage section 230 as the document image data with individual ID attached for each document. This document image data has a predefined field where characters are written in accordance with the type of read document. And the character images are recognized for each field. The character data verifying section 240 reads the character image from each field of the document image file, and selects the standard pattern most analogous to the character image, on the basis of the recognition result list, to decide the recognition result. And the character images are grouped for every decided recognition result, and stored in the character data storage section 250. Herein, individual character image is associated with the document image data stored in the document data storage section 230 and the field in the image data. By grouping the character images for every recognition result in this manner, the verification operation on the verification screen can be efficiently made using a user interface, as will be described later. Also, if the character image is associated with the field in the document image data, it is possible to determine whether or not the recognition result is matched with the character image from the context of the original document image data in the verification operation. The associated information between the character image and the document image data is grouped with the character image and stored in the character data storage section 25.

The character data display control section 220 controls the display for each area making up the verification screen. The character data display control section 220 reads the character image grouped for each recognition result from the character data storage section 250, upon a request from the operator's operation as will be described later. And the standard pattern corresponding to the character of recognition result is displayed as the recognition result character at a predetermined position on the verification screen. Moreover, the read character image is displayed one character after another near the recognition result character (e.g., adjacent position). The image displayed under the control of the character data display control section 220 will be described below in connection with an example of the display screen as shown in FIGS. 3 to 16.

The operation accepting section 260 detects an operation by the operator, such as displayed recognition result or corrected recognition result, and notifies the operation to the character data display control section 220 and the recognition result correcting section 270. For example, the operation accepting section 260 detects an operation of the input device, such as mouse or keyboard, by the operator. If the operation accepting section 260 detects the operation, the process for making various controls is started or ended. Also, an event occurring from the processing of an application can be detected, considering that the operation has been performed.

The recognition result correcting section 270 corrects the recognition result in accordance with a notification (operation of the operator) from the operation accepting section 260. That is, the recognition result correcting section 270 reads the document image data associated with the character image selected by the operation of the operator from the document data storage section 230. If this document image data is displayed on the display unit by the character data display control section 220, the operator can determine with the eyes whether or not the character image and the recognition result are matched from the context of entire document. And the recognition result of the character image is corrected on the basis of the input or selected contents, and stored as the new recognition result in the character data storage section 250.

The user interface provided in this embodiment will be described below.

FIG. 3 is a view showing an example of the verification screen displayed on the display unit 210 in this embodiment. In FIG. 3, this verification screen consists of a recognition result character display portion 310 for displaying the recognition result character, a character image display portion 320 for displaying the character image consecutively, a character image list display portion 330 for displaying a plurality of character images, like the character image display portion 320, an operation button group 340 for accepting an operation of the operator, a display rate changing portion 350 for changing the display rate of character image displayed sequentially on the character image display portion 320, and a text display portion 360 for displaying the input or read characters, which are arranged within a verification screen form 300.

The character image display portion 320 is arranged adjacently on the left side of the recognition result character display portion 310, as seen from the figure. The recognition result character display portion 310 displays the standard pattern image for use in recognizing the scanned character. The character image display portion 320 arranged adjacent to the recognition result character display portion 310 is composed of a character image verifying portion 321 and an image number display portion 322. The character image verifying portion 321 displays the character image read from the character data storage section 250. The character image displayed within a frame of this character image verifying portion 321 is limited to the character read from the predefined field of the document image data.

Also, the character image list display portion 330 is arranged on the left side of the recognition result character display portion 310 and the character image display portion 320. And the character image list display portion 330 can display the combinations of character image verifying portion 331 and image number display portion 332 in four rows times sixteen columns, as shown in the figure. That is, the character image list display portion 330 can display sixty four character images in total. The number of rows and the number of columns for the arrangement of character image verifying portions 331 and image number display portions 332 is only illustrative, but may be arbitrarily set up in accordance with the screen size of the display unit 210 and the operator's preference. This character image list display portion 330 displays the character images displayed on the character image display portion 320, as will be described later.

The operation button group 340 is under the control of the operation accepting section 260 for detecting an operation by the operator such as a keyboard operation or a click of mouse. And an image displayed within the verification screen form 300 is generated under the control of the character data display control section 220, upon a processing instruction notified from this operation accepting section 260. The screen transition for the verification screen by the operation of the operation button group 340 will be described below, using FIGS. 4 to 14.

The display rate changing portion 350 changes the rate at which the character image displayed sequentially on the character image display portion 320 transit (or the time for which one character image is displayed). In this way, the display rate can be set up in accordance with the recognition rate of the operator employing this verification system. The text display portion 360 can read the characters to be displayed on the recognition result character display portion 310 and the character image display portion 320, and decided by the input of the operator, or display the name of the character image (file) being currently read or the name of processing being currently performed.

The verification screen as above cited is only illustrative, but the verification screens realized in this embodiment is not limited to the number and arrangement as shown herein. For example, in designing the verification screen form 300, the recognition result character display portion 310 and the character image display portion 320 may be arranged to the left of the character image list display portion 330, or the recognition result character display portion 310 and the character image display portion 320 may be arranged vertically but not horizontally. Also, the number of character image verifying portions 331 or image number display portions 332 that can be contained in the character image list display portion 330 may be increased or decreased.

The operation in this embodiment will be described below.

FIG. 4 is a view showing a state in which the verification screen of FIG. 3 is initiated.

If the verification screen is initiated, the display of the character image list display portion 330 is once cleared, as shown in FIG. 4. Herein, by changing the name of character image file displayed in the text display portion 360, or selecting from the standard pattern list displayed by pop-up, the character to verify the recognition result is decided. Then, the recognition result character display portion 310 displays the standard pattern used in recognizing (discriminating) the character image. In the following, for the character image recognized as English alphabet "V" by the character data recognizing portion 240, it is determined whether the character image read from the document is correctly "V" or not (error recognition result). In the verification for error recognition result, alphabetical characters are exemplified here, but hiragana, katakana or kanji (Chinese character) may be employed to verify the recognition result on the verification screen in this embodiment. Moreover, typical symbols, figure or images may be employed, besides the characters.

In the state as shown in FIG. 4, if a button for starting the verification operation in the operation button group 340 is clicked or selected, this operation is notified to the character data display control section 220 by the operation accepting portion 260. And the character image recognized as "V" and grouped is read from the character data storage section 250 under the control of the character data display control section 220. An operation for starting the verification operation can be simplified by pressing a predetermined key in the keyboard, for example. The read character image is displayed sequentially in the character image display portion 320 and at the predetermined position of the character image list display portion 330 additionally. Namely, the character image displayed in the character image display portion 320 is changed sequentially. And the character image list display portion 330 displays a plurality of images, as will be described later.

In the course of the verification operation, to suspend the change of the display, as needed, the operator clicks or selects a button for stopping or ending a function of displaying sequentially the character image in the operation button group 340. If this operation is performed, the function of displaying sequentially the character image is stopped or ended under the control of the character data display control section 220. The operation for stopping or ending this function can be simplified by pressing a predetermined key. Likewise, by pressing a predetermined key, it is possible to make a control for decreasing one after another the character images displayed in the character image list display portion 330, for displaying the character image of one character, or the control for displaying previous one character.

FIG. 5 is a view showing a state of the verification screen when the verification operation is started.

If the verification operation is started, the standard pattern of the character "V" is displayed in the recognition result character display portion 310 of the verification screen and the first character image is displayed in the character image display portion 320 under the control of the character data display control section 220. The character image verifying portion 321 displays a character image cut out from a predetermined area of the document image in the character data recognizing section 240, and the image number display portion 322 displays the number attached to individual character image. Herein, the background color of the image number display portion 322 is determined according to the number, as will be described later.

The image verifying portion 331 and the image number display portion 332 provided at the lowermost row and the rightmost column in the character image list display portion 330 display the same character image as displayed in the character image display portion 320 and the number of the character image. In other words, the character image displayed at the predetermined position (lowermost row, rightmost column) of the character image list display portion 330 is also displayed in the character image display portion 320.

In verifying the first character image since the verification operation is started, the character image is displayed at the specific position in the character image list display portion 330, as shown in FIG. 5. In the following, the screen transition for the verification screen will be described below with the case where the character image is displayed sequentially in the course of the verification operation.

FIG. 6 is a view showing a state of the verification screen in which a plurality of character images are displayed in the course of verification operation.

As shown in FIG. 5, if the first character image is displayed in the character image display portion 320 for a predetermined period of time (slight amount of time), the second character image among the grouped character images is displayed in this character image display portion 320 under the control of the character data display control section 220. Then, the second character image displayed in the character image display portion 320 is displayed at the lowermost row and the rightmost column of the character image list display portion 330. And the first character image is displayed at the lowermost row and the second rightmost column of the character image list display portion 330. Likewise, if the third character image is displayed in the character image display portion 320 for a predetermined period of time, the third character image is displayed at the lowermost row and the rightmost column of the character image list display portion 330. And the first character image in the character image list display portion 330 is displayed at the lowermost row and the third rightmost column, and the second character image is displayed at the lowermost row and the second rightmost column, resulting in a state of FIG. 6.

In this manner, if the new character image is displayed in the character image display portion 320, the character image displayed at the lowermost row and the rightmost column of the character image list display portion 330 immediately before is shifted to the left by one column. Namely, the character image is shifted by one character in the direction of the arrow, every time the new character image is displayed. In this manner, the character image displayed in the character image display portion 320 (i.e., the character image displayed in the character image verifying portion 321 and the number displayed in the image number display portion 322 as a pair) is always displayed at a position most proximate to the character image display portion 320 in the character image list display portion 330.

In this verification screen, the period of time for which one character image is displayed in the character image display portion 320 (display change rate of the character image display portion 320) can be changed at will by setting a position in the display rate changing portion 350.

FIG. 7 is a view showing a state of the verification screen in which more character images are displayed than in the state of FIG. 6.

After the character images are displayed up to the leftmost column at the lowermost row of the character image list display portion 330, if the new character image is displayed in the character image display portion 320, the character image displayed at the lowermost row and the leftmost column is displayed at the second lowermost row and the rightmost column. Likewise, the character image displayed at the second lowermost row and the leftmost column is displayed at the third lowermost row and the rightmost column. Namely, every time the new character image is displayed in the character image display portion 320, the character images displayed within the character image list display portion 330 are shifted as indicated by the arrow.

In this embodiment, if a predetermined operation is performed, the character images amounting to one line (eight characters) are displayed successively, and then the display is suspended. And if the predetermined operation is performed again, the character images of another one line are displayed successively. In this manner, if a preset number of character images are displayed successively, the display is suspended under the control, whereby it is possible to prevent the mis-recognized character image from being overlooked because the character image is out of sight of the operator.

FIG. 8 is a view showing a state of the verification screen where the mis-recognized character image is displayed in the character image display portion 320.

In the operation for verifying the error recognition result, the operator watches carefully the recognition result character display portion 310 and the character image display portion 320 on the verification screen. In the state as shown in FIG. 8, the character image display portion 320 displays the character image (different from the standard pattern) analogous to character "J", but not "V" as indicated in the standard pattern. This means that there is the possibility that character "J" is mis-recognized as character "V" in the character data recognizing section 240. In this state, the operator performs a predetermined operation to stop the character image of "J" in the character image list display portion 330 to be moved to the left. Thus, it is possible to verify in detail whether the character image displayed in the character image display portion 320 is "V" or "J", as will be described later.

FIG. 9 is a view showing a state of the verification screen where the mis-recognized character image is displayed in the character image list display portion 330.

The operator watches carefully the recognition result character display portion 310 and the character image display portion 320 to find the mis-recognized character image ("J" indicated in FIG. 8) in the character image display portion 320. In this case, it is considered that some character images may be newly displayed before the operator suspends the operation of displaying the character image sequentially. As shown in FIG. 9, the mis-recognized character image can not be verified in the character image display portion 320, but can be searched in the character image list display portion 330. In the suspended state as shown in FIG. 9, the display position of the character image thought to be mis-recognized is shifted by five columns away from the lowermost row and the rightmost column of the character image list display portion 330 (at the lowermost row and the sixth column from the right side). In this case, the operator turns the line of sight slightly left to find a different character from the standard pattern. Since the character image displayed in the character image display portion 320 is also displayed at the lowermost row and the rightmost column and then shifted sequentially from that position, in the suspended state, the mis-recognized character image is displayed at the position relatively closer to the character image display portion 320 in the character image list display portion 330, as shown in FIGS. 5 to 7.

As described above, the image number display portion 322 displayed in the character image display portion 320 and the image number display portion 332 displayed in the character image list display portion 330 are colored. As shown in FIG. 9, the character image list display portion is grouped for every eight character images, each group being assigned a different color, in this embodiment. The color of the image number display portion 332 has gradation. If the image number display portion is colored in this way, the operator can roughly perceive (remember) the color of the image number display portion 322, when the character image thought to be mis-recognized in the character image display portion 320 is displayed and passed over the lowermost row and the rightmost column of the character image list display portion 330, whereby the operator can find out the mis-recognized character image by following the color of the image number display portion 332.

On the verification screen, the operator watches carefully the recognition result character display portion 310 and the character image display portion 320 that are displayed adjacently to make verification visually. That is, the operator only needs to gaze at one position within the verification screen displayed under the control of the character data display control section 220. Even if the character image thought to be mis-recognized is passed over the character image display portion 320 (and the lowermost row and the rightmost column of the character image list display portion 330), the operator can find out relatively simply this character image thought to be mis-recognized by looking at the position relatively closer to the character image display portion 320 in the character image list display portion 330. This is because the character image displayed in the character image display portion 320 is displayed in the character image list display portion 330 by being shifted one character, whereby the movement of operator's eyes is very small even if the operator moves the line of sight. Employing this verification screen, there is no need for performing a complicate verification operation in which the operator must watch carefully plural positions within the verification screen by moving the line of sight at any time. In this way, the operator can be relieved of the fatigue of eyes in the verification operation. Since the operator can find out the mis-recognized character image by gazing at the same position, there is less possibility of missing check as compared with when the operator moves the line of sight over the wide range for verification.

FIG. 10 is a view showing a state of the verification screen in correcting the recognition result of the mis-recognized character image that is displayed in the character image list display portion 330.

If the character image thought to be mis-recognized is found, displaying sequentially the character image in the character image display portion 320 and the character image list display portion 330 is suspended, upon the operation of the operator, as previously mentioned. Herein, it is supposed that the operator finds that the character image having the number "13" of the image number display portion 332 displayed in the character image list display portion 330 of FIG. 10 is mis-recognized. And the operator selects this character image thought to be mis-recognized by clicking it with the mouse. Then, a text input portion 333 appears under the character image verifying portion 331. This text input portion 333 is a region for accepting an input operation from the keyboard, and displaying the input and converted character. If the character image mis-recognized is clearly seen from the character image verifying portion 331, the recognition result can be corrected by inputting the correct character into the text input portion 333.

By the way, the character image is grouped for each recognition result and stored in the character data storage section 250. Also, the document data storage section 230 stores the document image data (i.e., image data of scanned document) associated with individual character images (predefined fields of the document image data). When correcting the recognition result of character image on the verification screen, the document image data that is recognition source of the character image can be read and displayed on the display unit 210 for reference.

FIG. 11 is a view showing an example of a document image screen 400 displayed on the display unit 210. This document image screen 400 is displayed by clicking any character image in the character image list display portion 330 as described in connection with FIG. 10. A character recognition field 410 is set up within the document image screen 400, and the character data recognizing section 240 recognizes the characters written in this character recognition field in a process of recognizing the character. As shown in FIG. 11, a character "J" is written in the character recognition field 410. In this manner, because the document image screen 400 can display the entire document image that is read, it can be seen that character "J" is a part of symbol "JF". Also, it is possible to determine whether or not it corresponds to the recognition result character from the total context of scanned document. And it is possible to verify that the character image recognized as the standard pattern "V" is "J" in reality. The operator corrects the recognition result of character image based on this determination. Also, the document image screen 400 can display not only the character image of the character written inside the character recognition field 410 but also the entire image of scanned document, whereby the actually written character can be discriminated, even though the character in the document is written outside the character recognition field 410.

FIG. 12 is a view showing a state of the verification screen where the recognition result of the mis-recognized character image is corrected.

If the correct character (here, "J") is input into the text input portion 333 within the verification screen as shown in FIG. 12, on the basis of the visual verification by the operator, the recognition result correcting section 270 corrects the recognition result grouped and stored in the character data storage section 250. That is, the recognition result correcting section 270 deletes the character of number "13" from the group in which the recognition result is "V". And the character image deleted from the group of "V" is added to the group of character image in which the recognition result character is "J", and stored in the character data storage section 250. In this case, the associated information regarding this character image, such as document image, together with the character image, is added to the group of new recognition result. In this manner, the recognition result correcting section 270 corrects the mis-recognized character image.

FIG. 13 is a view showing a state of the verification screen after the recognition result of the character image is corrected.

In FIG. 13, the character image verifying portion 331 for the character image (character image of number "13") in which the recognition result is corrected within the character image list display portion 330 is displayed in a different color from the character image verifying portions 331 for other character images. In this way, it is possible to distinguish at a glance between the character image in which the recognition result is correct and the character image mis-recognized in which the recognition result is corrected.

FIG. 14 is a view showing a state of the verification screen after the recognition results of a plurality of character images are corrected.

In this example of FIG. 14, among sixty four (four rows and sixteen columns) character images displayed in the character image list display portion 330, the character images with number "13" (character image in which "J" is mis-recognized as "V") and numbers "26" and "39" (character image in which "U" is mis-recognized as "V") in the image number display portion 332 are corrected. And the character image verifying portions 331 for displaying these character images are displayed in different color from the character image verifying portion 331 for displaying other character images (character images in which the recognition result is correct). In this manner, the character images in which the recognition result is corrected after error recognition result can be displayed as a list on the verification screen.

In the above, the recognition result is verified and corrected by making an operation on the character image displayed within the character image list display portion 330. However, the recognition result may be corrected in the following manner.

FIG. 15 is a view showing another example of the verification screen in correcting the recognition result of the mis-recognized character image. Herein, the character image thought to be mis-recognized is displayed in the character image display portion 320, and if the operator finds the mis-recognized character image, displaying the character image sequentially is suspended upon a predetermined operation of the operator. If the operator makes a predetermined operation on the character image display portion 320, a text input portion 323 is displayed, and the document image is verified on the document image screen 400, as shown in FIG. 11. The correct recognition result is input into the text input portion 323, as shown in FIG. 15. In this case, the recognition result correcting section 270 performs a modification process to correct the recognition result in the same manner as described above.

In FIGS. 3 to 15, the operator verifies the character images by watching carefully the recognition result character display portion 310 and the character image display portion 320 as a pair which are adjacent each other. However, plural pairs of them may be provided. For example, when two pairs of recognition result character display portion 310 and character image display portion 320 are arranged longitudinally, the new character image is displayed sequentially in the lowermost row and the second lowermost row of the character image list display portion 330. Also, when four pairs of recognition result character display portion 310 and character image display portion 320 are arranged, the new character image is displayed sequentially from the lowermost row to the uppermost row of the character image list display portion 330. In this manner, it is possible to set up the number of pairs of standard pattern and character image that are displayed at a time according to the verification skill of the operator under the control of the character data display control section 220. Since most people can verify up to four characters at a time, this pair is desirably up to four rows.

Also, in FIGS. 3 to 15, one pair of recognition result character display portion 310 and character image display portion 320 are watched carefully. However, the verification screen in this embodiment may be arranged as follows to verify the character image mis-recognized.

FIG. 16 is a view showing another example of the verification screen displayed on the display unit 210. The verification screen as shown in FIG. 16 comprises the recognition result character display portion 310 for displaying the standard pattern of recognition result character, and the character image list display portion 330, which is arranged in proximity to the recognition result character display portion 310, for displaying the character image sequentially as well as displaying a plurality of character images in a list format. Like the above example, the new character image is displayed at the lowermost row and the rightmost column (predetermined position) of the character image list display portion 330. And the character images already displayed in the character image list display portion 330 are shifted by one character, every time the new character image is displayed. On this verification screen, the operator can verify the presence or absence of mis-recognized character image by watching carefully the standard image displayed in the recognition result character display portion 310 and the character image displayed sequentially at the predetermined position of the character image list display portion 330.

FIG. 17 is a flowchart showing the flow of a process for displaying the verification screen in this embodiment.

In this embodiment, the document image acquired by scanning the entire document is stored in the document data storage section 230. The character data recognizing section 240 makes character recognition by reading the character image in a predetermined area of this document image. And the character image is grouped for each recognition result character, and stored in the character data storage section 250. In the case of verifying the recognized character image, the verification screen with the GUI parts arranged at predetermined positions is displayed. The standard pattern for the recognition result character is displayed at the predetermined position on the verification screen, and the character image recognized as the standard pattern is displayed sequentially at the position in proximity to the standard pattern. The operator can verify intuitively and easily whether or not there is an error recognition result by watching carefully this standard pattern and the character image displayed sequentially without moving the line of sight at any time.

If the operator performs an operation for verifying arbitrary character on the verification screen displayed, the operation accepting section 260 detects this operation (step 1701), which is then notified to the character data display control section 220. The character data display control section 220 reads the standard pattern for the specified character in accordance with this notification, and displays this standard pattern in the recognition result character display portion 310 arranged at the right lower corner on the verification screen (step 1702). Moreover, the character data display control section 220 reads the group of character images recognized as the standard pattern from the character data storage section 250 (step 1703). And the first character image among the group of character images is displayed in the character image display portion 320 adjacently on the left side of the recognition result character display portion 310, and the character image is displayed at the lowermost row and the rightmost column of the character image list display portion 330 provided on the left side of the character image display portion 320 (step 1704). If the first character image is displayed for a predetermined period of time, the character data display control section 220 determines whether or not there is the next character image among the group of character images read (step 1705).

If it is determined at step 1705 that the next character image exists, the display area of the character image in the character image list display portion 330 is appropriately changed (step 1706), and the new character image is displayed in the character image display portion 320 and at a predetermined position of the character image list display portion 330 (step 1707). The process from step 1705 to step 1707 is repeated till all the character images grouped are displayed. If it is determined at step 1705 that there is no next character image, namely, the last character image among the character images grouped is displayed in the character image display portion 320, displaying the character image sequentially on the verification screen is ended.

FIG. 18 is a flowchart showing the flow of a process for correcting the recognition result in this embodiment.

The process for correcting the recognition result of one character image will be described below. If the operator finds the character image thought to be mis-recognized and performs a predetermined operation (suspend operation) in the course of the process as shown in FIG. 17, the operation accepting section 260 accepts the operation for suspending to display the character image sequentially (step 1801). And the operator determines whether or not it is necessary to correct the recognition result of the character image by comparing the standard pattern and the character image on the suspended verification screen (step 1802). Herein, if it is determined that it is unnecessary to correct the recognition result, the new character image is displayed in the character image display portion 320 and the character image list display portion 330, as indicated at steps 1705 to 1707 in FIG. 17 (step 1803). That is, displaying the character image sequentially is resumed, and this process is ended.

If the operator determines at step 1802 that the recognition result needs to be corrected, and performs an operation for correcting the recognition result, the operation accepting section 260 accepts this operation (step 1804), which is notified to the character data display control section 220. And the character data display control section 220 displays a screen for enabling the operator to select whether or not to verify the document image from which the character image is read (step 1805). If the operation for verifying the document image is selected, the character data display control section 220 reads and displays the document image from which the character image is read from the document data storage section 230, upon the operation of the operator that is accepted by the operation accepting section 260 (step 1806). If the operation for verifying the document image is not selected, the processing at step 1806 is omitted.

The recognition result correcting section 270 determines whether or not the recognition result is corrected upon an operation of the operator, namely, a notification from the operation accepting section 260 (step 1807). Herein, if it is determined that the recognition result is not corrected, the process is ended.

If it is determined at step 1807 that the recognition result is corrected, the recognition result correcting section 270 corrects the recognition result of selected character image, based on the recognition result character decided by the input of the operator. Namely, the recognition result correcting section 270 deletes the character image having the recognition result character corrected from among the character images grouped and stored in the character data storage section 250. And this character image is added to the group of new recognition result character decided, thereby reflecting the corrected contents to the character data storage section 250 (step 1808). The character image having the recognition result corrected is already displayed in the character image list display portion 330, but after the recognition result is corrected at step 1808, the background color of the character image is changed and displayed (step 1809). Since the corrected recognition result is reflected to the character data storage section 250, the character image having the recognition result corrected is not displayed, when the same recognition result character and character image are displayed on the verification screen at the next time and beyond.

As described above, in verifying the recognition result on the verification screen in this embodiment, the operator is only required to watch carefully the recognition result character display portion 310 and the character image display portion 320. If the character image different from the recognition result character is displayed in the character image display portion 320, the operator recognizes that the character image looks different from the afterimage of the sequentially displayed character image. The operator can find out the mis-recognized character image intuitively and easily by searching the character image having different afterimage. By making the verification operation on the verification screen, it takes a shorter time to verify the recognition result than for each one character. Moreover, it is possible to relieve the burden and fatigue of the operator.

ADVANTAGES OF THE INVENTION

As described above, with this invention, in designing the screen for user interface, it is possible to increase the productivity of the operation for verifying the scanned character, and to relieve the burden and fatigue of the operator.

Also, with this invention, it is possible to implement a display control method for the screen on which the scanned image and the recognition result can be discriminated intuitively and easily.

The invention claimed is:

1. An optical character recognizer comprising:
character recognition means for recognizing a character image as a character;
display means for displaying a predetermined screen providing a user interface; and
display control means for controlling the display of the screen to be displayed on said display means;
wherein said display means displays a pair of display portions arranged at predetermined positions within said screen and a list display portion;
said display control means displays the standard pattern indicating the recognized character on one of said pair of display portions, and displays sequentially a recognized character image in another of said pair of display portions and at a predetermined position of said list display portion, wherein a part of said display portion for displaying said character image has a colored region displayed in color, and said display control means changes the gradation of the color of said colored region for every predetermined number of images and repeats the gradation for a subsequent number of characters as more character images are displayed sequentially.

2. The optical character recognizer according to claim 1, wherein a part of said display portion for displaying said character image has a sequential number display region for displaying the number, and said display control means changes the number displayed in said sequential number display region as more character images are displayed sequentially.

3. The optical character recognizer according to claim 1, wherein said pair of display portions are arranged adjacent to each other, and said list display portion is arranged near said pair of display portions, wherein said display control means displays sequentially a character image at a position of said list display portion divided into a matrix that is closest to said pair of display portions, and displays already displayed character images in said list display portion at the positions becoming more distant from said pair of display portions as more character images are displayed sequentially in time at a time-based display rate selectable by a display rate controller that varies the display rate.

4. The optical character recognizer according to claim 1, wherein said display control means displays a plurality of pairs of display portions, with a first of the plurality of pairs being associated with a first group containing a first plurality of recognized character images recognized as being a first standard pattern, and a second of the plurality of pairs being associated with a second group containing a second plurality of recognized character images recognized as being a second standard pattern that is different from the first standard pattern.

* * * * *